United States Patent [19]

Yoshida et al.

[11] Patent Number: 5,018,716
[45] Date of Patent: May 28, 1991

[54] SHEET TRANSPORTING APPARATUS WITH CONTROL MEANS

[75] Inventors: Akimaro Yoshida, Tokyo; Takeshi Honjo, Kawasaki, both of Japan

[73] Assignee: Canon Kabushiki Kaisha, Tokyo, Japan

[21] Appl. No.: 321,635

[22] Filed: Mar. 9, 1989

[30] Foreign Application Priority Data

Mar. 11, 1988 [JP] Japan .................................. 63-057756
Mar. 14, 1988 [JP] Japan .................................. 63-060106

[51] Int. Cl.$^5$ .......................................... B65H 7/02
[52] U.S. Cl. ........................................ 271/227; 271/3.1; 271/229; 271/265; 271/270; 355/208
[58] Field of Search ............... 271/270, 229, 226, 227, 271/228, 245, 256, 258, 246, 3, 3.1, 176, 182, 202-203, 242, 259, 265; 250/214 AG, 205, 214 C, 212; 355/208, 215, 230, 75

[56] References Cited

U.S. PATENT DOCUMENTS

| | | | |
|---|---|---|---|
| 4,097,732 | 6/1978 | Krause et al. ...................... | 250/205 |
| 4,275,968 | 6/1981 | Irwin ................................. | 271/270 X |
| 4,331,328 | 5/1982 | Fasig .................................. | 271/270 |
| 4,540,170 | 9/1985 | Masuda et al. ..................... | 271/259 |
| 4,579,444 | 4/1986 | Pinckney et al. .................. | 355/75 X |
| 4,670,647 | 6/1987 | Hubble, III et al. ............. | 271/259 X |
| 4,725,053 | 2/1988 | Bastow et al. ..................... | 271/270 X |
| 4,763,160 | 8/1988 | Honjo ............................... | 271/259 X |
| 4,804,998 | 2/1989 | Miyawaki ......................... | 271/258 X |
| 4,817,933 | 4/1989 | Honjo et al. ..................... | 271/225 X |
| 4,966,355 | 10/1990 | Katafuchi et al. ............... | 271/227 X |

Primary Examiner—Robert P. Olszewski
Assistant Examiner—Boris Milef
Attorney, Agent, or Firm—Fitzpatrick, Cella, Harper & Scinto

[57] ABSTRACT

There is disclosed an automatic document feeder for the copying machine or the like, which is capable of adjusting the sheet transporting speed automatically according to the sheet quality or the status of sheet transportation. The feeder detects the status of transportation in the first, and accordingly adjust the transporting speed for the subsequent sheets. Additionally, a monitor monitors the operational state of the transport mechanism by monitoring detection output of a detection sensor when an original sheet is not present and corrects the transport timing on the basis of the information so obtained.

16 Claims, 26 Drawing Sheets

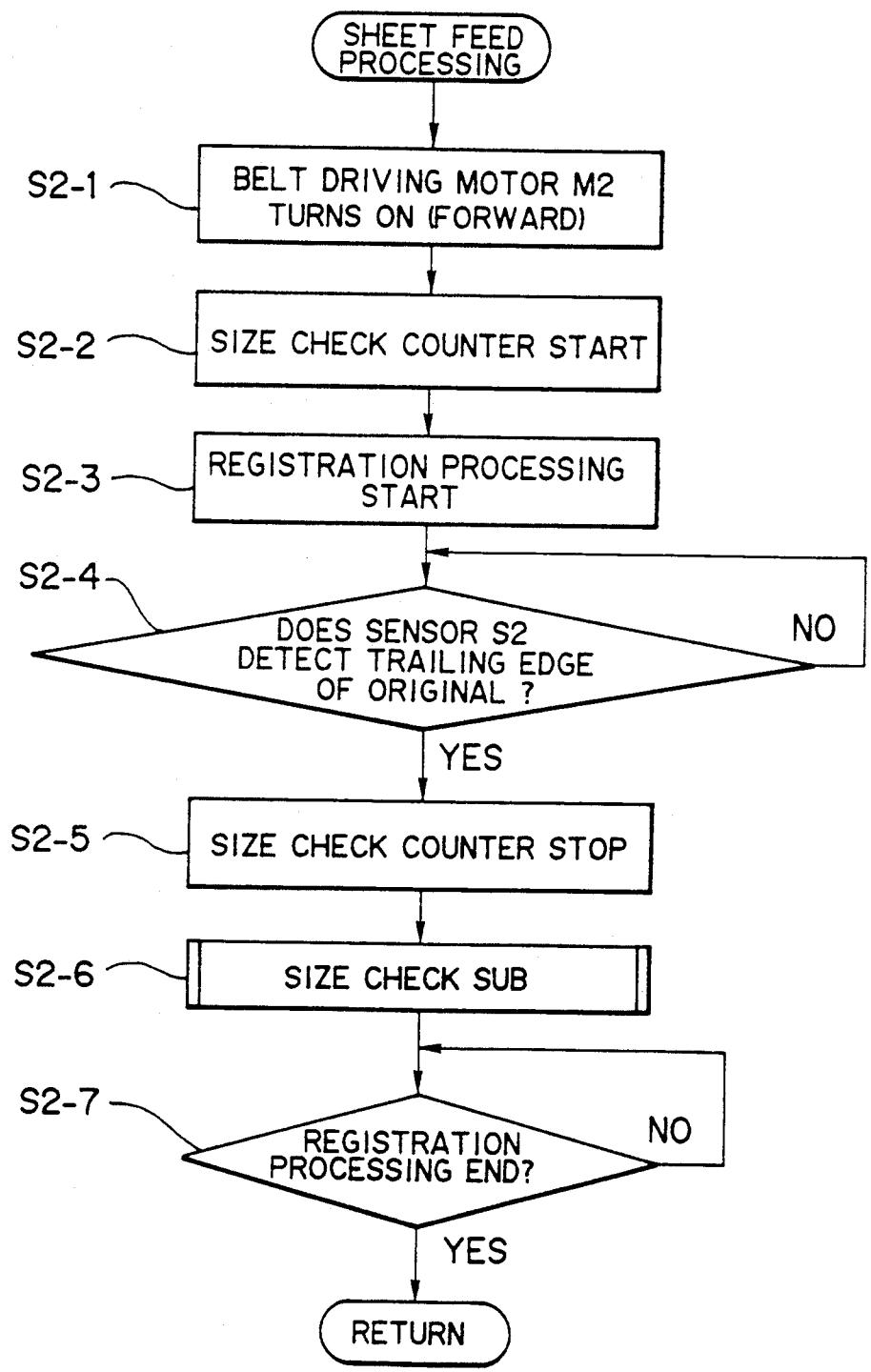

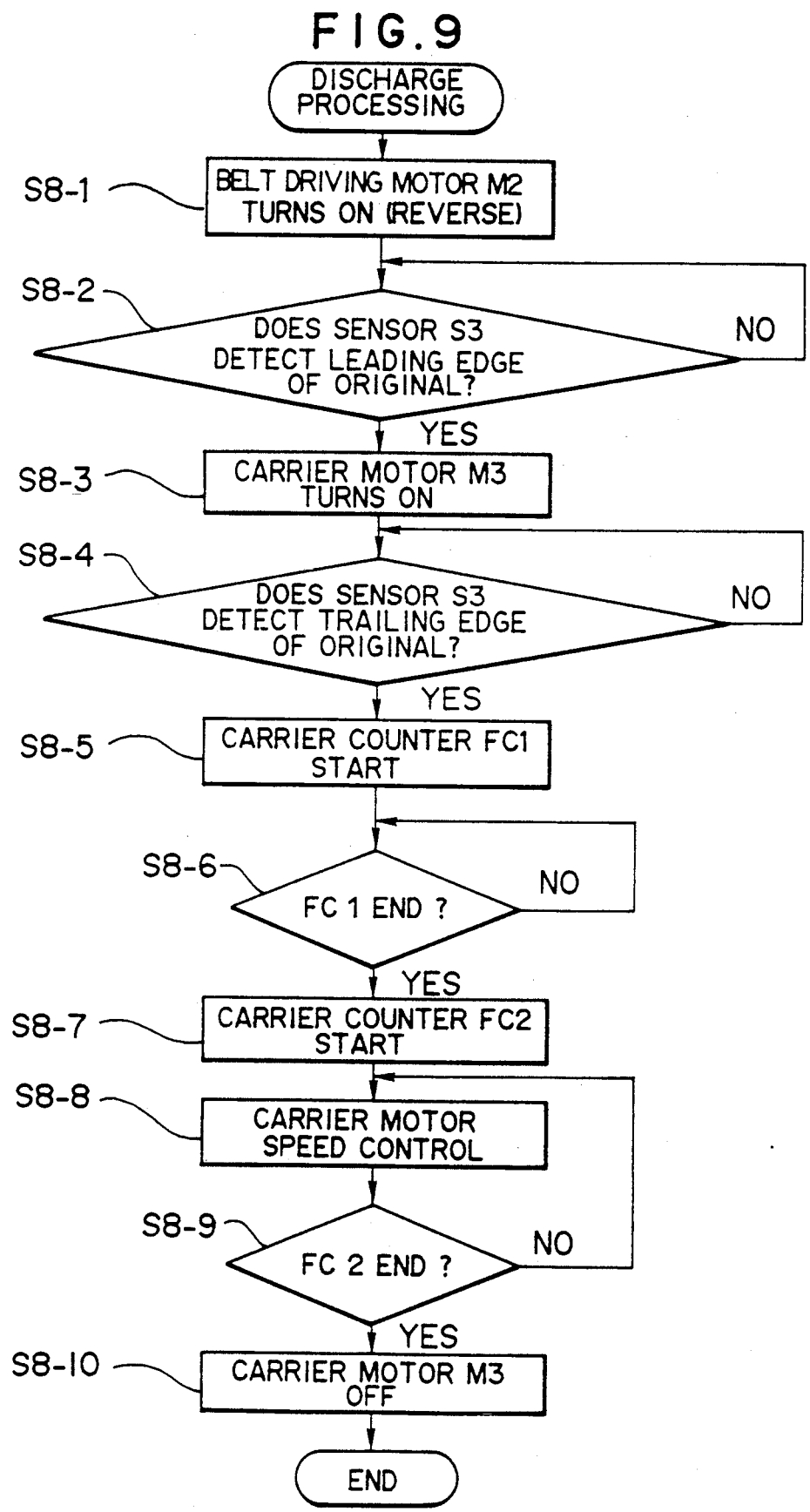

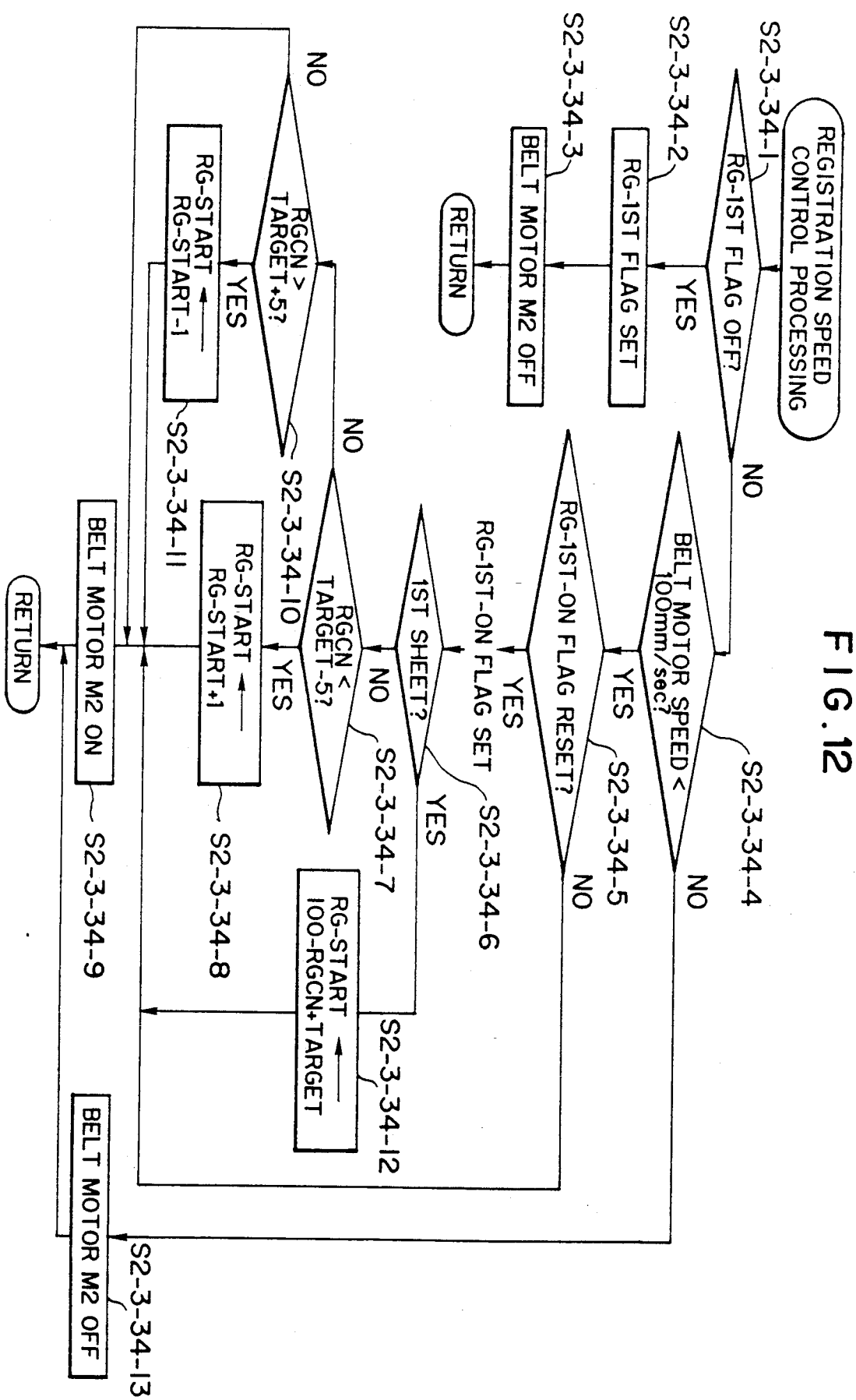

STEP 2 : SHEET FEED PROCESSING

FIG. 19A
STEP 7 : DISCHARGE PROCESSING
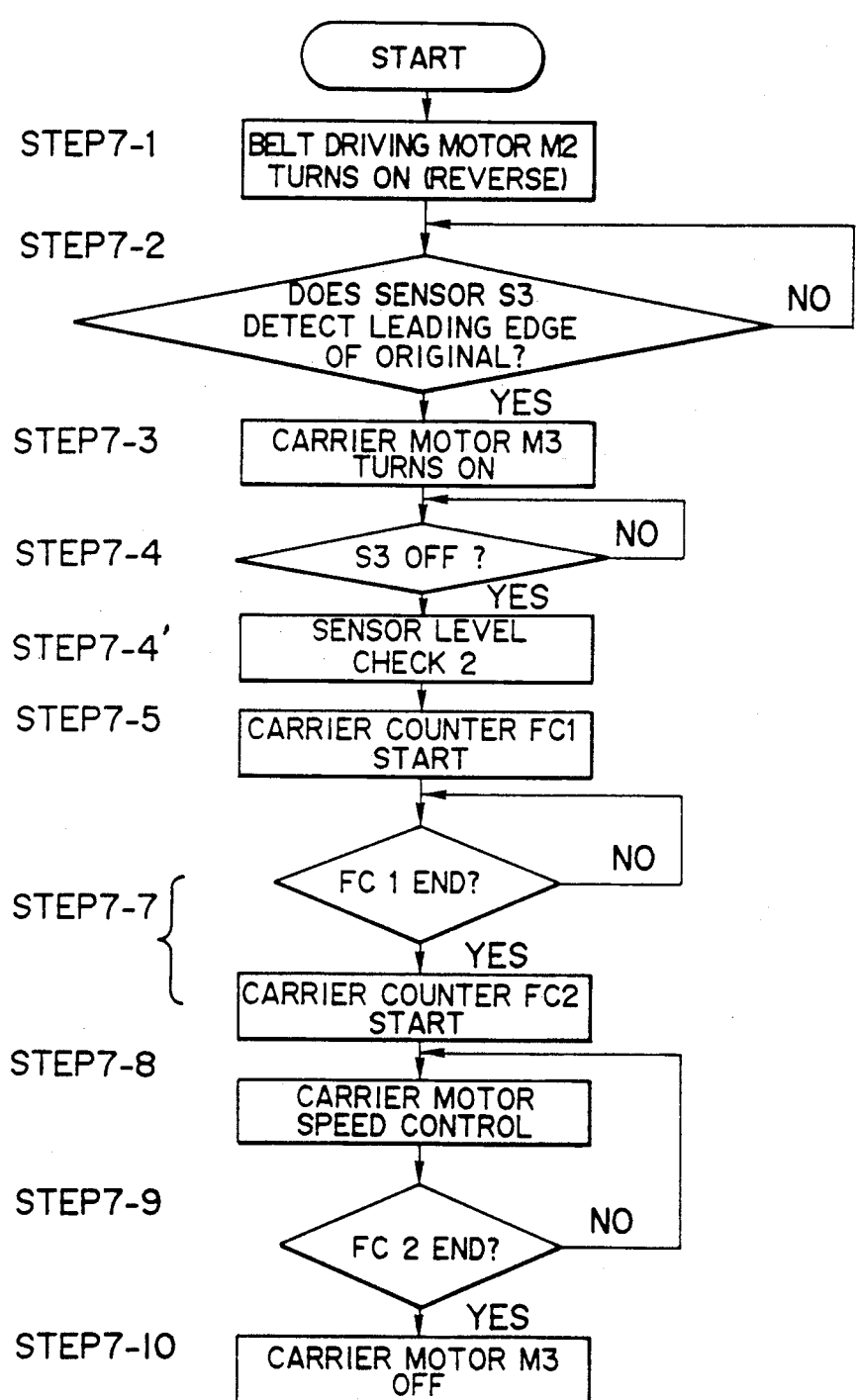
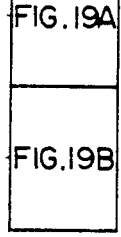

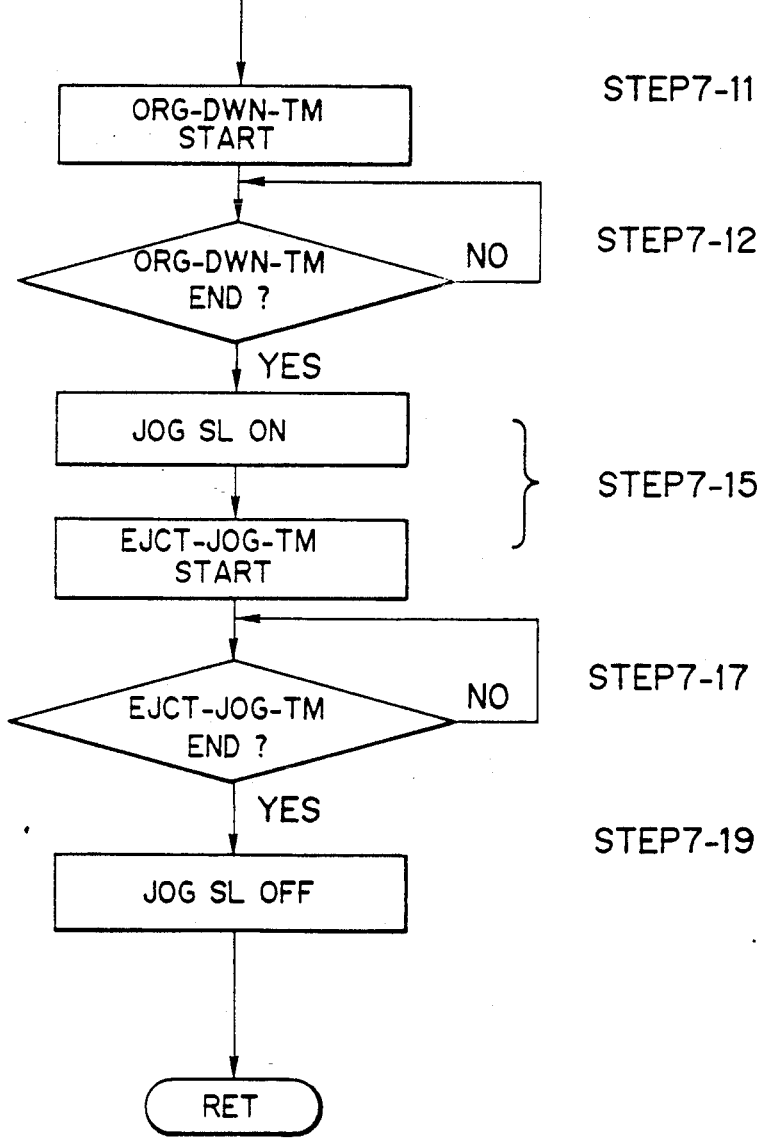

SUB 1 : JOGGING PROCESSING

SUB 4 : SENSOR LEVEL CHECK ①

SUB 5 : SENSOR LEVEL CHECK ②

SHEET TRANSPORTING APPARATUS WITH CONTROL MEANS

BACKGROUND OF THE INVENTION

1. Field of the Invention

The present invention relates to a sheet handling apparatus for transporting sheets, and more particularly to an automatic document feeder for transporting original document sheets from a stacker to an exposure unit of an image forming apparatus such as a copying machine, a laser beam printer or the like.

2. Related Background Art

In conventional recycling automatic document feeders, the original sheet documents stacked on an original stacker are fed one by one, from the lowermost one, to the exposure unit of an image forming apparatus such as a copying machine, and are returned, after the required exposure operation, to the above-mentioned original stacker. Such feeding operation is repeated for a required number of cycles, one cycle being the feeding operations of a number corresponding to that of the original documents in the stack.

In such conventional automatic document feeders, speed control and stopping control are applied to the transportation of the original documents, in order to stop each document exactly on a platen glass.

However, such conventional feeders have required an unnecessarily long time for exchanging the original document because the stable control has only been achieved with loose timing, in order to absorb fluctuations in the sheet size, sheet quality and load of the system.

Also for controlling the timing of original document transportation, there has been provided at least one original detecting means, and, in a position requiring a high precision in the timing control, there has been employed a transmissive or reflective analog photosensor for detecting the document itself and generating an analog output signal.

However, in such conventional technology, in which the presence or absence of an original document has been identified by binary digitizing the output of said analog photosensor, difficulties such as deteriorated stopping accuracy of the original document, untidy stacking of the discharged original documents, and eventually sheet jamming, have been unavoidable due to the difference between the actual passing of the document and the electrical detection thereof resulting from fluctuations in the analog level or sensor response caused by dust, paper powder, temperature, humidity etc.

SUMMARY OF THE INVENTION

In consideration of the foregoing, an object of the present invention is to provide an improved sheet feeding apparatus.

Another object of the present invention is to provide a sheet feeding apparatus capable of reducing the time required for sheet transportation.

Still another object of the present invention is to provide a sheet feeding apparatus capable of improving the accuracy of sheet transporting control.

Still another object of the present invention is to provide a sheet feeding apparatus capable of preventing abnormality in the sheet transportation.

Still another object of the present invention is to provide an automatic document feeder capable of prolonging the period of high speed transportation of the original document, thereby reducing the time required for the original feeding.

Still another object of the present invention is to provide an automatic document feeder effecting speed control and stopping control for each exchange of the original in the course of one-by-one feeding of the original documents stacked on a stacker to a predetermined position of an image forming apparatus, provided with control means for effecting the control at predetermined timings for the first sheet feeding, storing the result of said control in memory means, and adjusting the start timing of speed control for the second and subsequent original documents according to said result.

Still another object of the present invention is to provide an image forming apparatus capable of correcting the control timing of original document transportation, according to the output of original detecting means provided in an original document transport path.

The foregoing and still other objects of the present invention, and the advantages thereof, will become fully apparent from the following description, which is to be taken in conjunction with the attached drawings.

BRIEF DESCRIPTION OF THE DRAWINGS

FIGS. 6 to 9 are flow charts showing control sequences to be executed by a microcomputer 60 in said embodiment;

FIGS. 11A–11C and 12 are flow charts showing control sequences to be executed by the microcomputer 60 in relation to the speed control of the original documents;

FIG. 19 composed of FIGS. 19A and 19B is a flow chart of a sheet discharging processes in said embodiment;

DETAILED DESCRIPTION OF THE PREFERRED EMBODIMENTS

Now the present invention will be clarified in detail by embodiments thereof shown in the attached drawings.

Figure 1:
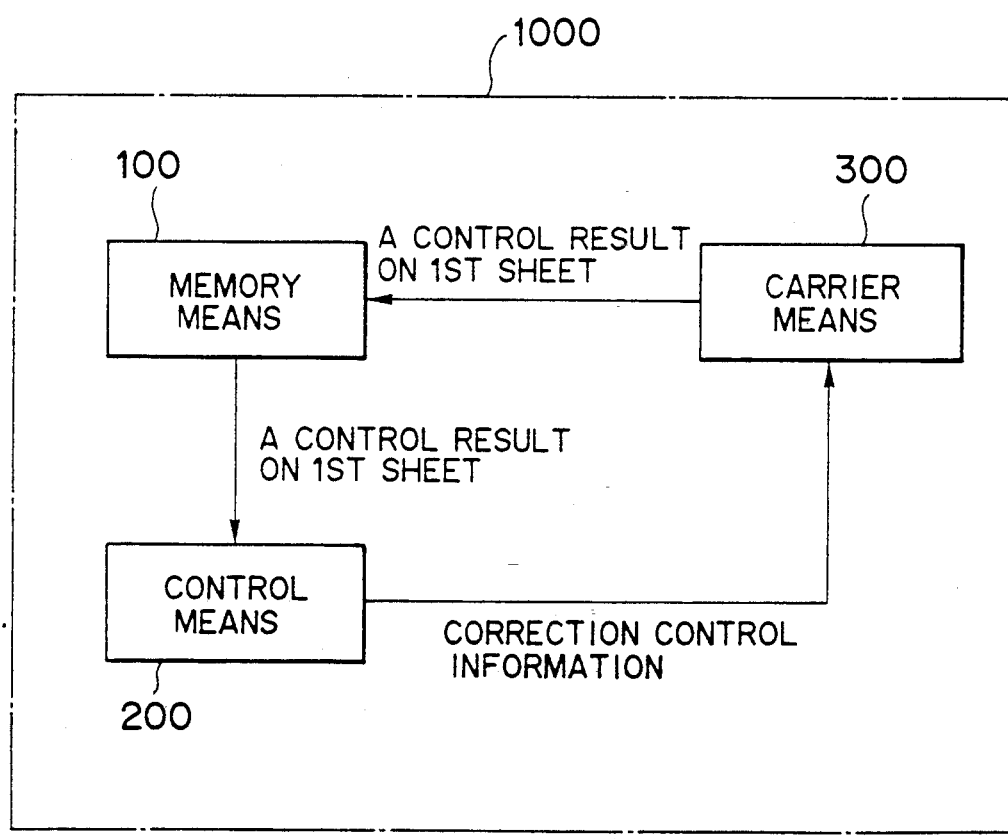
FIG. 1 is a schematic block diagram of basic structure embodying the present invention.

FIG. 1 shows the basic structure of embodiments of the present invention.

In FIG. 1, a chain-lined block 1000 indicates an automatic document feeder effecting, in feeding, sheet by sheet, the original documents stacked on a stacker to a predetermined position of an image forming apparatus, speed control and stopping control for the fed document at each exchange of the document.

There are provided memory means 100 for storing the result of control for the feeding of the first document; and control means 200 for regulating the start timing of the speed control for the transport means 300 for subsequent documents.

Prior to the explanation of the present invention, there will be given an explanation on the automatic document feeder.

Figure 2:
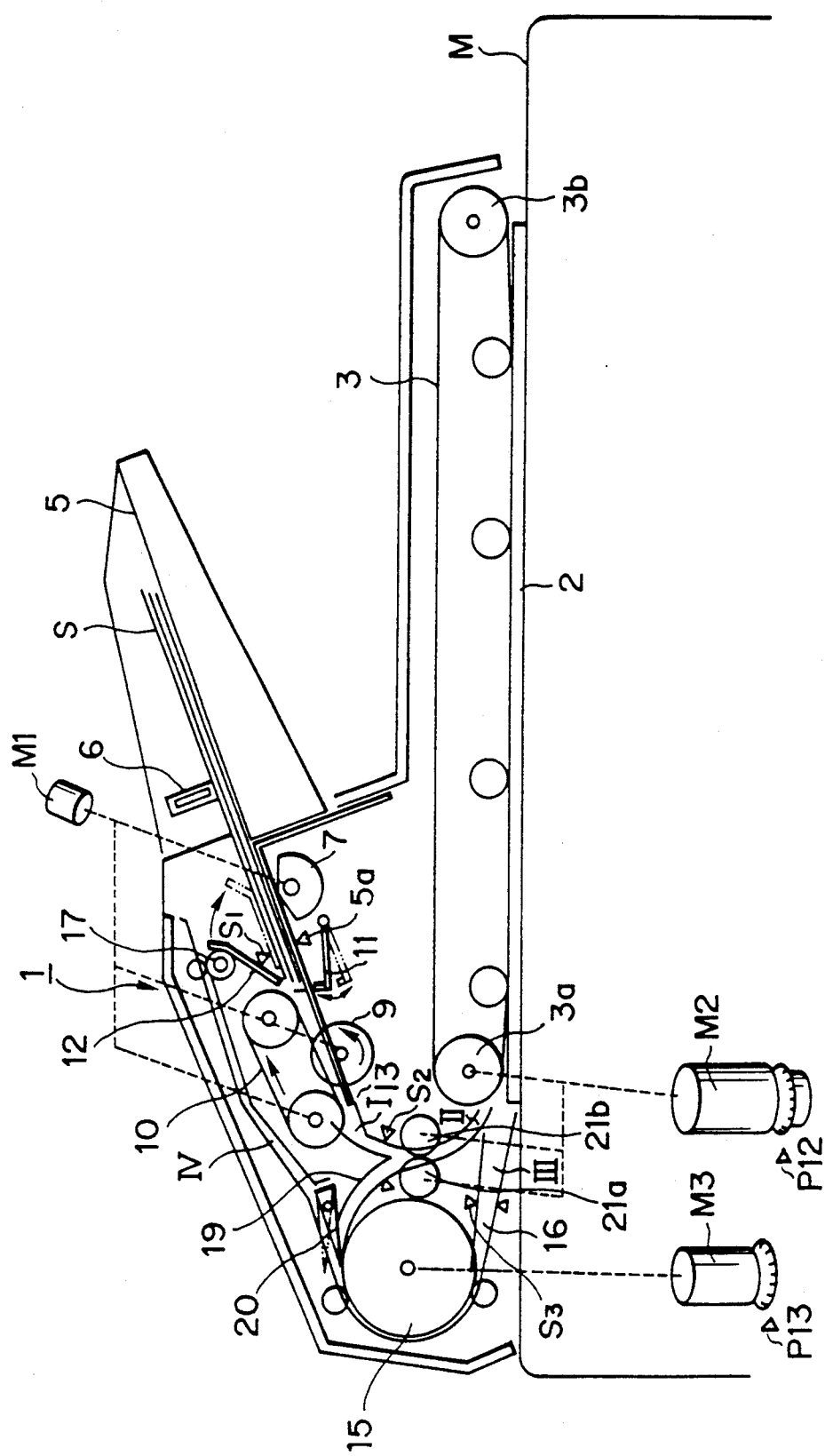
FIG. 2 is a lateral view of an apparatus embodying the present invention.

FIG. 2 shows an embodiment of the present invention, in which an automatic document feeder 1 is positioned above a platen 2 of a copying machine M, and a conveyor belt 3 supported by a driving roller 3a and an idler roller 3b. Above said conveyor belt 3 there is provided an original stacker 5 for supporting a stack of plural original documents S. Said original stacker 5 is provided with a recycle lever 6 for separating the original document before processing from those already processed.

At the base portion 5a of the original stacker 5 there is provided a semi-circular feeding roller 7, and, at the downstream side thereof, there is provided a separating unit consisting of a transport roller 9 and a separating belt 10.

The stack of the original documents S on the stacker 5 are fed by the feeding roller 7 toward the separating unit 9, 10, and are separated and advanced one by one from the lowermost document, by the transport roller 9 rotated in the forward direction, and the separating belt 10 rotated in reverse direction.

Between said feeding roller 7 and the separating unit 9, 10 there is provided a stopper 11 which is in the solid-lined position for defining the front ends of the original documents at the setting thereof, but is shifted to a broken-lined position by the energization of a stopper solenoid at the feeding of the original documents.

From the downstream end of the separating unit 9, 10 to the conveyor belt 3 there is provided a sheet feed path 13, through which the original document sheet S is supplied from the separating unit 9, 10 to the gap between the conveyor belt 3 and the platen 2, and is placed at the predetermined position thereon.

Close to the feed path 13 there is provided an inverting roller 15. A sheet discharge path 16 is formed from the conveyor belt 3 to the original stacker 5 along the external periphery of said inverting roller 15, whereby the original document S placed on the platen 2 is re-transported through said sheet discharge path 16, and is discharged by a discharge roller 17 provided at the downstream end thereof on top of the stack of the original documents on the original stacker 5.

An inverting path 19 branches from the discharge path 16 at the top of the inverting roller 15 and joins the feed path 13, and a path switching flapper 20 is provided at said branching portion.

In discharging the original document, said flapper 20 is in the solid-lined position to guide said original document toward the original stacker 5, but, in inverting the original document, it is shifted to a broken-lined position by the energization of a flapper solenoid to guide said original document through the inverting path 19 toward the platen 2. At the downstream side of the pointing portion of said feed path 13 and inverting path 19, there are provided carrying rollers 21 for transporting the original document S supplied through the feed path 13 or the inverting path 19 toward the platen 2.

In the following there will be explained the original transporting operation of the automatic document feeder 1.

The operator sets a stack of original documents S to be copied on the original stacker 5, then enters an operation mode (number of copies, image magnification, image density etc ) from an operation panel of the copying machine M, and actuates a copy start key, whereupon the original stack S is fed by the feeding roller 7 to the separating unit 9, 10.

Then the original documents are separated one by one from the lowermost sheet in the separating unit 9, 10 and are supplied through the feed path 13 onto the platen 2. After the exposure, the original documents S are discharged through the discharge path 16, and fed by the discharge roller 17 on top of the stack S on the stacker 5.

Figure 3:
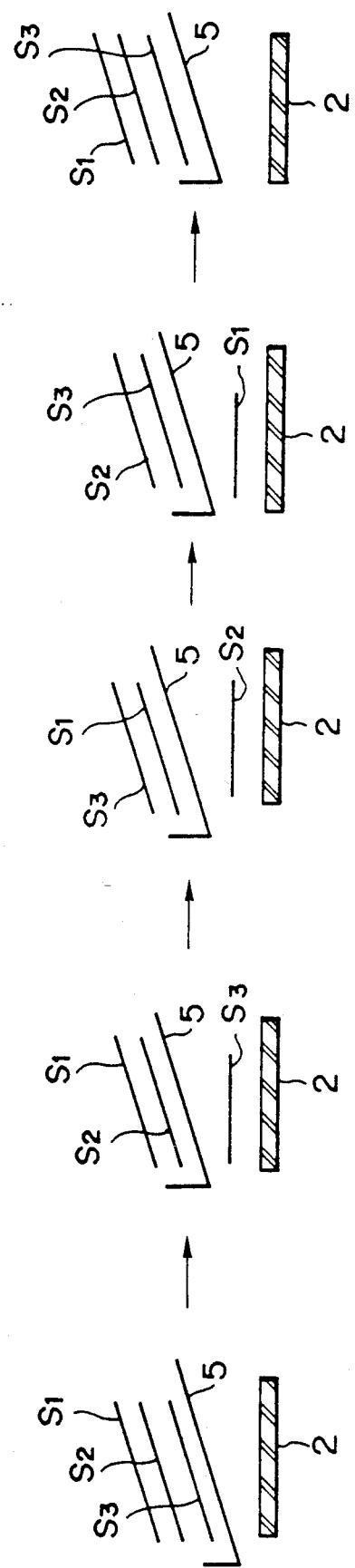
FIG. 3 is a schematic view of transportation sequence of one-sided original documents in said embodiment of the present invention.
Figure 4:
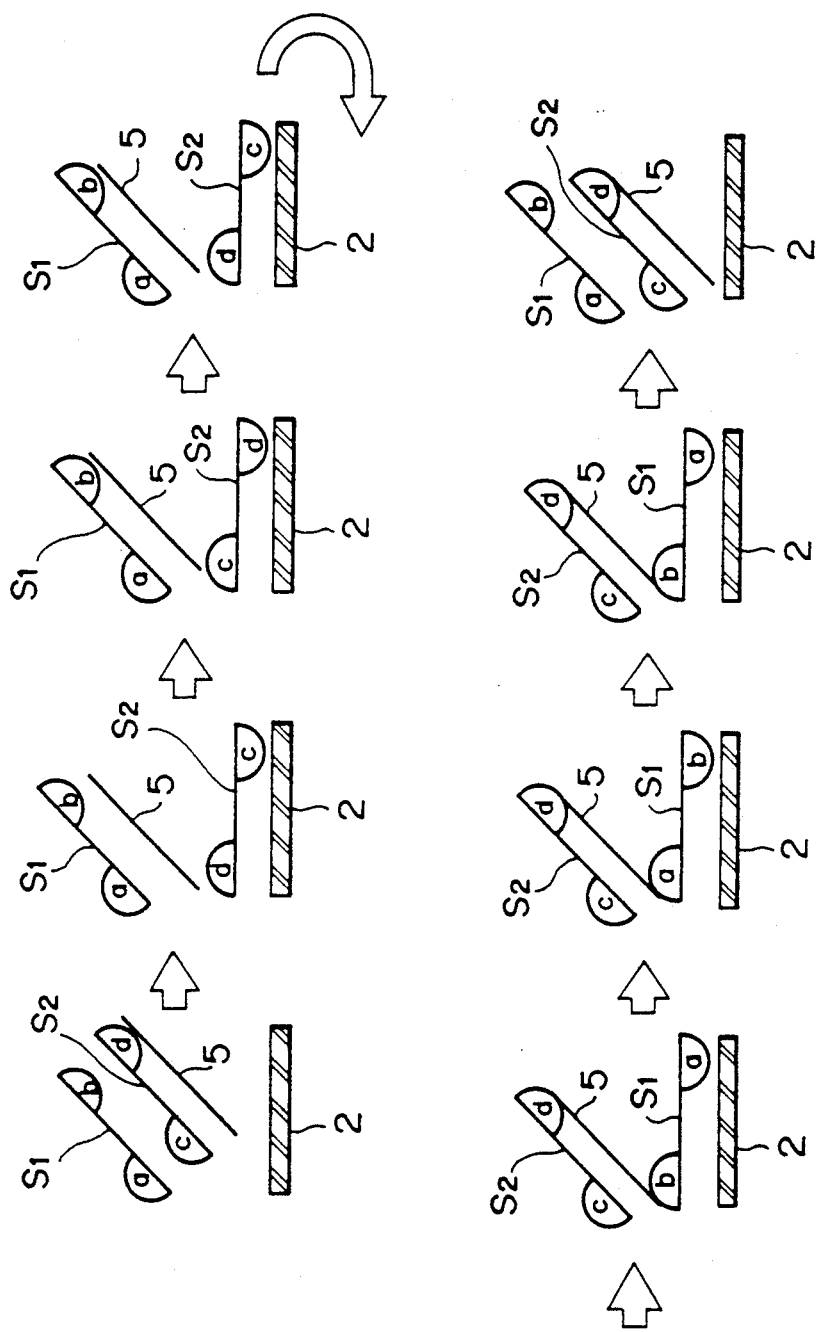
FIG. 4 is a schematic view of transportation sequence of two-sided original documents in said embodiment of the present invention.

FIG. 3 illustrates the sequence for three one-sided original documents S1, S2, S3. The feeding and the re-stacking are conducted from the lowermost original document S3, and a cycle of processing is completed by the steps shown in FIG. 3. A required number of copyings can be obtained by repeating said cycle by a corresponding number of times Also FIG. 4 illustrates the sequence for two two-sided originals S1, S2.

At first the lower original document S2 is fed and placed with a face c downwards on the platen 2, but said face c is not copied in order to maintain the sequence of pages. Therefore said original document is inverted through the inverting path 19 and is copied with a rear face d downwards on the platen 2.

Subsequently it is inverted again through the inverting path 19, then is copied with the face c downwards on the platen 2, and is discharged onto the original stacker 5.

Similarly the faces b, a of the next original document S1 are copied, and said document is stacked on the stacker 5. In this manner a cycle of image processing for a set of two-sided original document is completed by the steps shown in FIG. 4, and a desired number of image processings can be obtained by repeating said cycle by a corresponding number of times.

Figure 5:
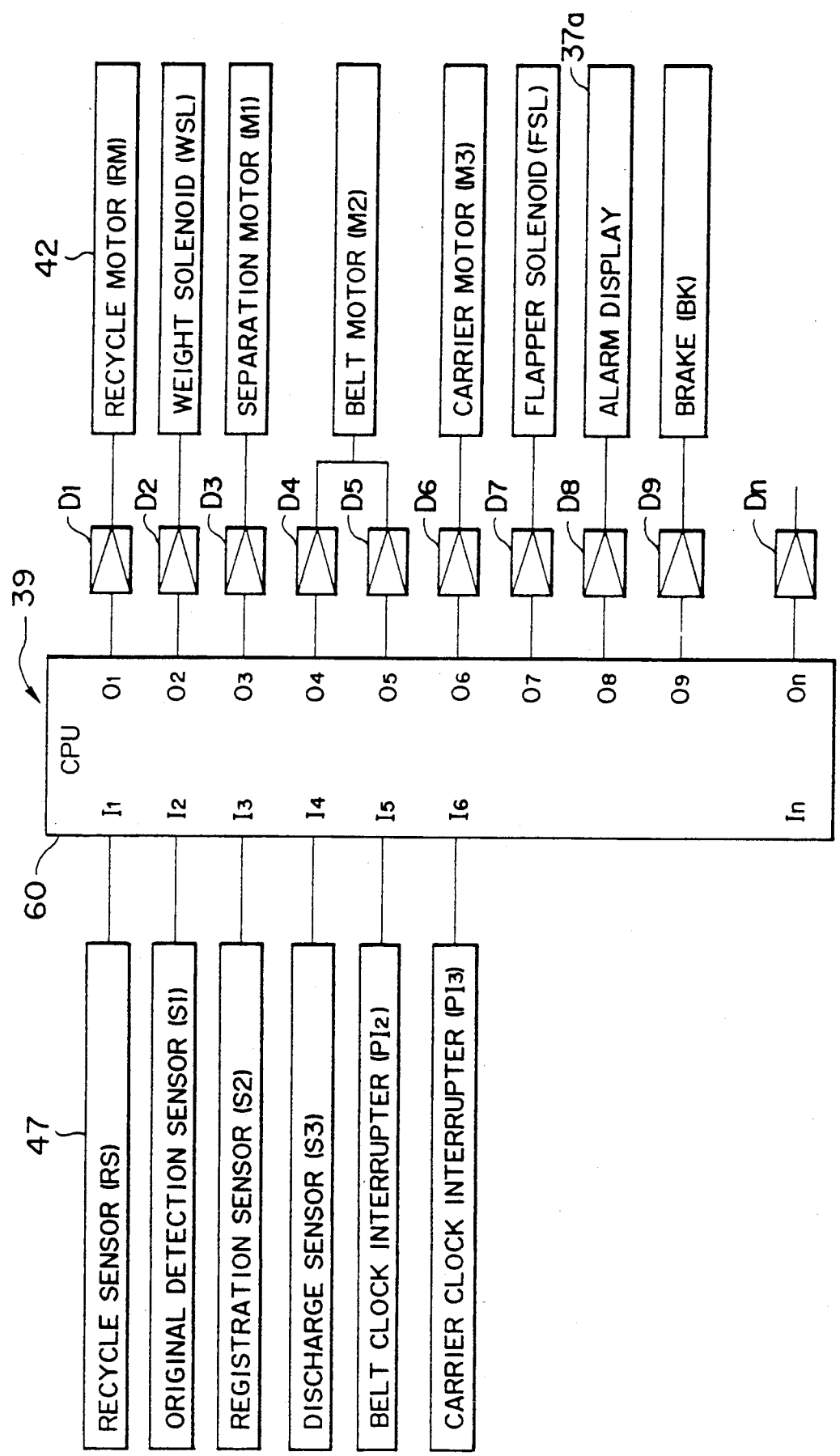
FIG. 5 is a block diagram of a control unit of said embodiment of the present invention.

FIG. 5 is a block diagram of a control circuit of an embodiment of the present invention.

The control circuit is mainly composed of a known one-chip microcomputer 60 incorporating ROM, RAM etc. and receiving signals from various sensors at input ports Il–In.

Also various loads are connected to output ports Ol–On of the microcomputer 60 through drivers Dl–Dn.

An input port I1 is connected to a recycle sensor (RS) 47 for detecting the state of a flag activated by the recycle lever 6; I2 to an original detection sensor (S1) for detecting the absence or presence of the original documents on the stacker 5; I3 to a registration sensor (S2) for determining the process of original transportation in sheet paths I, II in the feed path 13; and I4 to a sheet discharge sensor (S3) for determining the timing of sheet discharge onto the stacker.

An output port O1 is connected to a recycle motor 42 for driving the recycle lever 6; O2 to a weight solenoid for driving a weight 12; and 08 to an alarm LED 37a for indicating abnormality in the original document.

An output port O3 is connected to a separation motor (M1) for driving the semi-circular roller 7 and the separating unit (transport roller 9 and separating belt 10). Output ports O4, O5 are connected to a belt motor (M2) for driving the conveyor belt 3 and the registration rollers 21a, 21b, through a forward-reverse circuit. An output port 06 is connected to a carrying motor (M3) for driving the inverting roller 15; and an output port 07 is connected to a flapper solenoid for driving the flapper 20 for selecting the inverting or discharge path.

Figure 6:
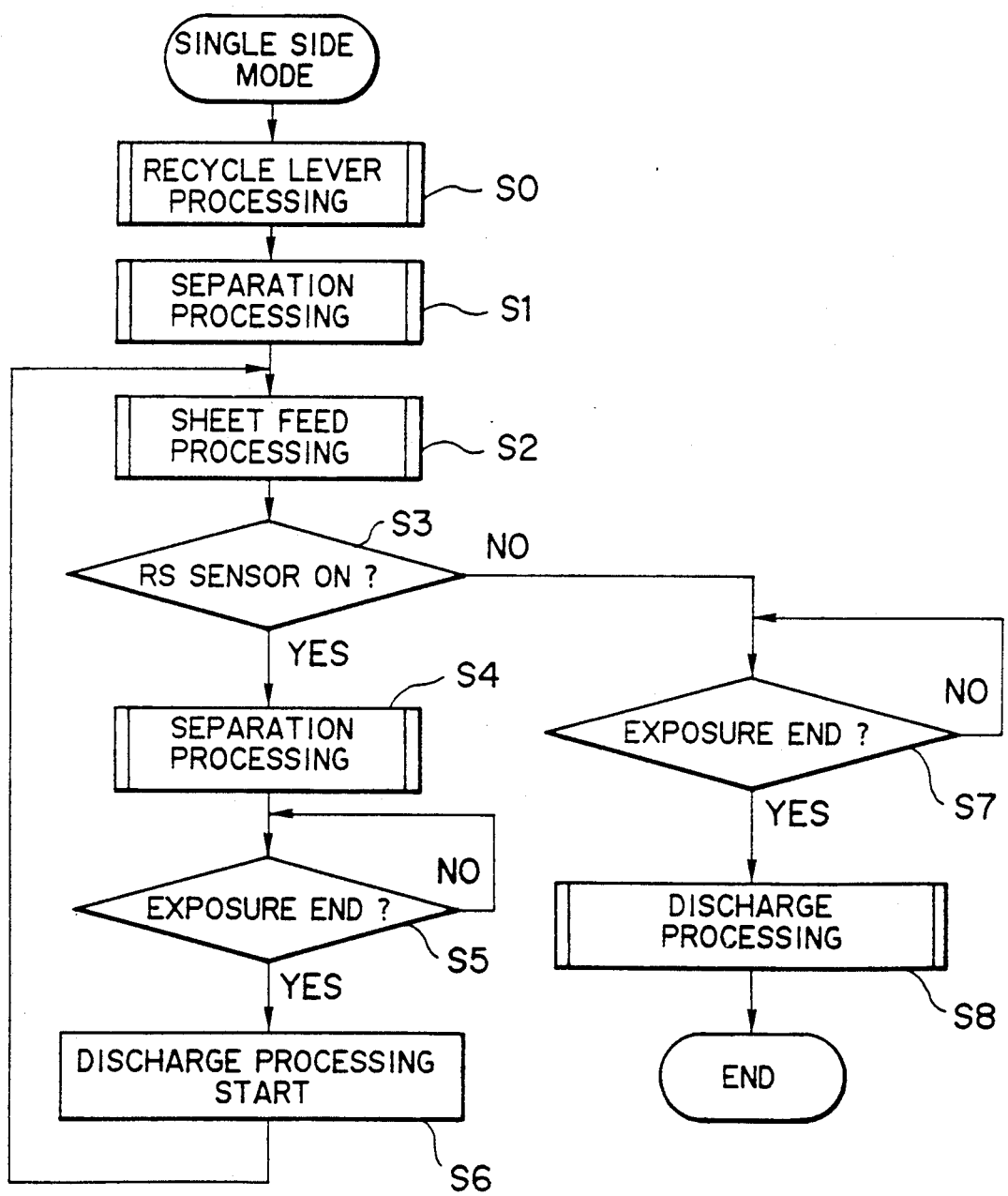

FIG. 6 is a flow chart of the main control sequence of the present embodiment.

In the following there will be explained, as an example, the function is a one-sided mode shown in FIG. 3.

At first a recycle lever process is conducted to make a partition in the stack of the original document on the tray 5 (step 0). Then a separating process (step 1) is conducted for feeding the original documents from the lowermost one to the sheet path I, and a feeding process (step 2) is conducted to feed the separated sheet from the path I through the sheet path II and stop it on the platen glass. Upon completion of the feeding process, the image forming apparatus M initiates the image formation by exposure and image reading.

During said exposure operation, the microcomputer 60 discriminates whether the original stack is at the end of a cycle, from the state of the recycle sensor indicating the state of the recycle lever (step 3). If the sensor is on, indicating that the stack is not at the end of a cycle, there is conducted a separation process for the next original document (step 4). Then, after the completion of exposure (step 5), the sheet discharge process is started (step 6), and the feeding process for the next original document is stated.

If the step 3 identifies that the recycle sensor is off, indicating that the original stack is at the end of a cycle, the completion of exposure is awaited (step 7), and the original document is discharged (step 8) to complete the operation of a cycle.

The operations of recycle lever, separation, sheet feeding and sheet discharge will be explained in the following.

Figure 7B:
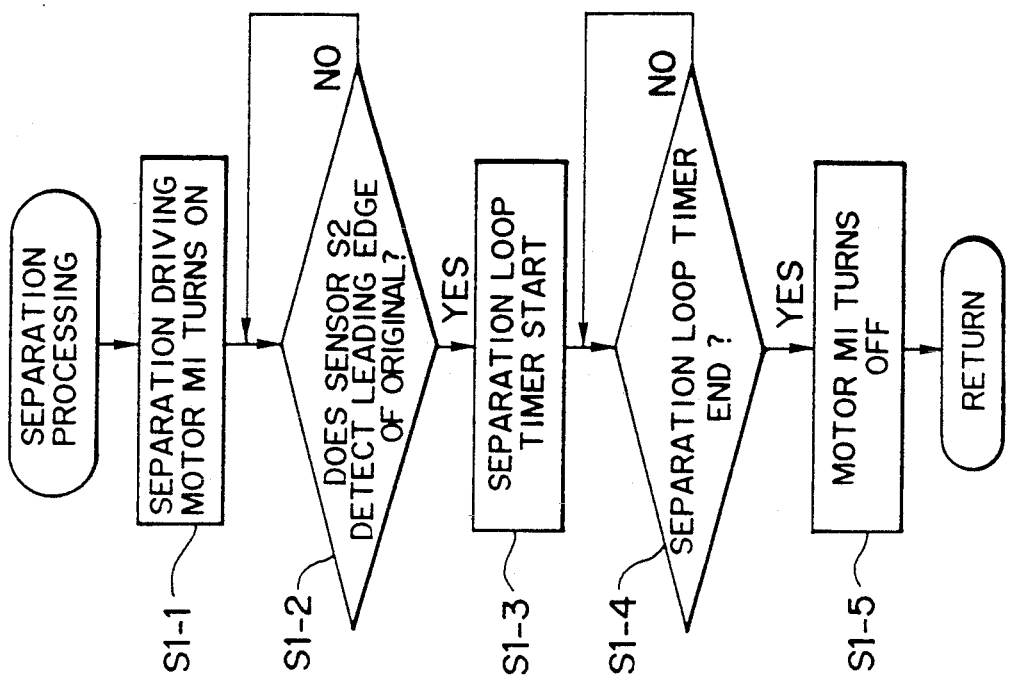
Figure 7A:
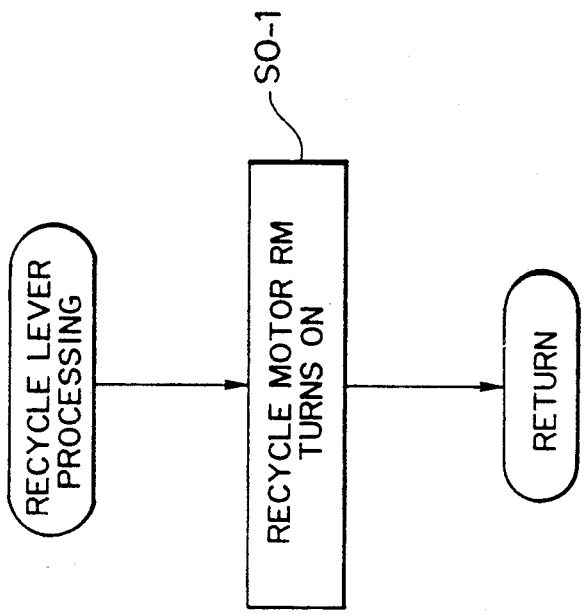

FIG. 7A is a flow chart showing the recycle lever process in the step 0 in FIG. 6.

In this flow chart, the recycle motor RM is turned on (step S0-1) to rotate the recycle lever onto the original stack, thereby separating the original documents S before exposure from those already exposed. In this manner the recycle lever process is completed.

FIG. 7B is a flow chart showing the separation routine in the step 1 in FIG. 6.

At first the separation motor M1 is activated in order to separate the lowermost original document only in the stack (step 1-1). When the sheet feed sensor S2 detects the leading end of the original document proceeding in the sheet path I (step 1-2), a separation loop timer is activated (step 1-3). After the expiration of said timer (step 1-4), the separation motor 7 is turned off whereby the leading end of the original document enters the nip between the registration rollers 21a, 21b (step 1-5).

As the separation motor 7 is stopped after the formation of predetermined loop in the original document, a skewed advancement of the document can be corrected (cf. FIG. 3).

FIG. 8 shows the details of the feeding operation of the step 2 in FIG. 6.

At first the belt motor M2 is activated in the forward direction to drive the registration rollers 21a, 21b and the conveyor belt 3 for transporting the original document from the sheet path I to II (step 2-1), and simultaneously activated is a size check counter for counting the clock pulses supplied from a belt clock photointerruptor PI2 to the input port I5 (step 2-2).

Simultaneous with the start of measurement of the original size, there is activated the registration operation (step 2-3) to be explained later. Simultaneous with the passing of the rear end of the original document through the sensor S2 (step 2-4), the size check counter is deactivated (step 2-5), and a size check sequence (FIG. 13) is executed on the thus obtained data, thereby determining the original size (step 2-6).

The feeding operation of the step 2 is completed when the above-explained registration operation is completed (step 2-7) (FIG. 6).

The count data obtained in the above-mentioned size check sequence are added with data corresponding to the distance from the nip position of the registration rollers 21a, 21b to the feed sensor 52 to obtain corrected data indicating the actual original size. In this state the original document is carried by the registration rollers 21a, 21b and the conveyor belt 3, and the amount of said carrying securely corresponds to the count of the belt clock photointerruptor PI2. Consequently the size determination in the present embodiment, such as B5, A4, A4R, B4 or A3 size, is achieved by the comparison of thus corrected size data with predetermined size data (cf. FIG. 13).

FIG. 9 shows the details of the sheet discharge operation (step 8) in FIG. 6.

At first the belt motor M2 is activated in reverse direction, in order to discharge the original document positioned on the platen glass 2 (step 8-1), and a carrier motor M3 is turned on when the front end of the original document is detected by the sensor S3 (steps 8-2, 8-3). Thus the original document is transported along the sheet paths III and IV, and, upon detection of the rear end of the original document by the sensor S3 (step 8-4), a carrier counter FC1 is started (step 8-5).

Said counter FC1 is used for controlling the start timing of the speed control of the carrier motor M3, in order to align the discharged sheet, and, in the present embodiment, the distance of said control is selected about 50 mm shorter than the distance from the sensor S3 to the final roller 17 of the sheet path IV.

The counting-up of said counter FC1 is controlled by an interruption process of the input from a carrier clock photointerruptor for the carrier motor M3 to the input port I6 of the microcomputer 60, so that the count securely corresponds to the carried distance of the original document.

After the completion of counting operation of the counter FC1, there is started a carrier counter FC2 (step 8-7), which is used for determining the distance of speed control of the carrier motor for aligning the original document on the tray 5. Said distance is selected as about 70 mm in the present embodiment. When the aligned discharge of the original document is completed at the end of the counting operation of said counter FC2 (step 8-9), the carrier motor M3 is turned off (step 8-10) (cf. FIG. 6).

Figure 10A:
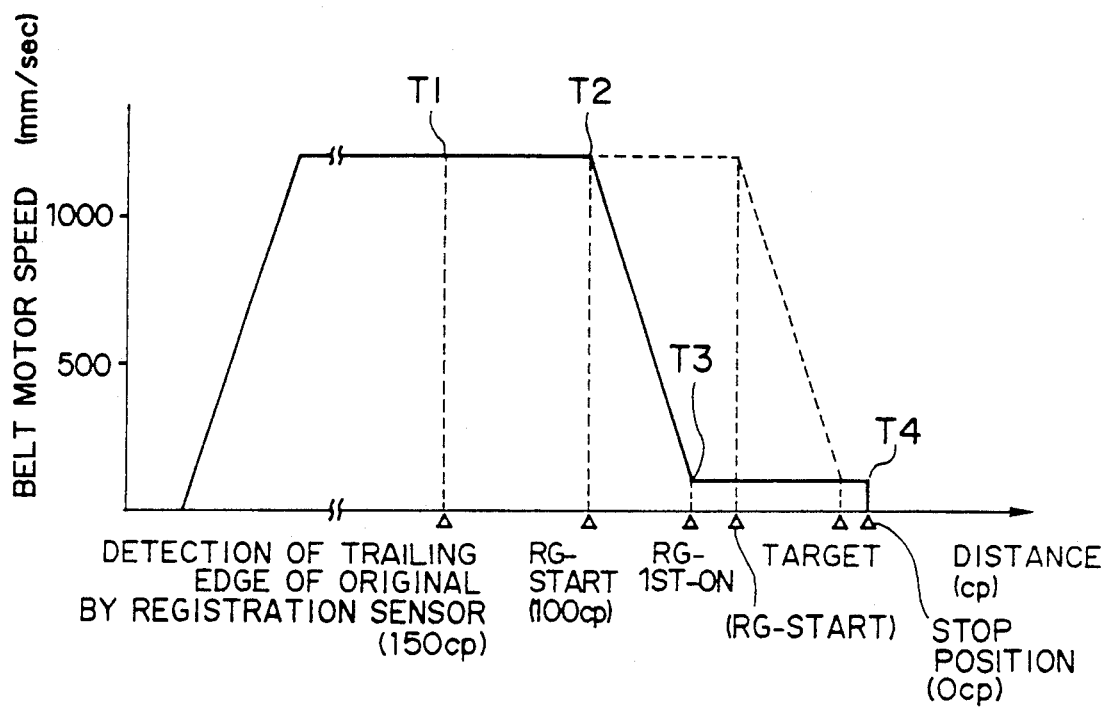
FIGS. 10A and 10B are schematic charts showing the working principle of said embodiment.

In the present embodiment, the belt motor M2 is controlled with speed characteristics as shown in FIG. 10A, in order to stop the original document precisely at a predetermined position on the platen glass 2. In said speed control, the belt motor M2 is subjected to a deceleration, called registration, when the original document is immediately before stopping, and the brake is applied simultaneously with the arrival of the original document at the stopping position, thereby preventing the overrun of the original document.

Figure 10B:
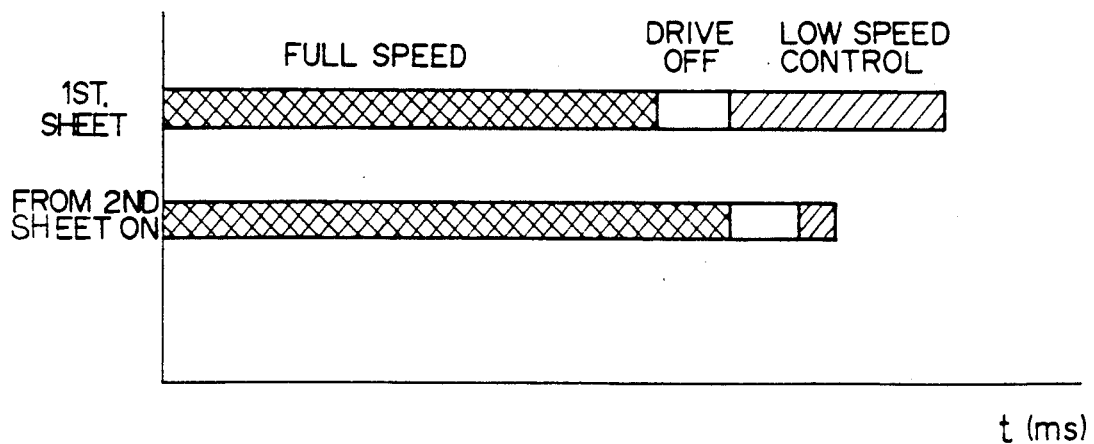

Now reference is made to FIGS. 10A and 10B for explaining the learning function in the speed control of the belt motor in the present embodiment.

Referring to FIG. 10A, at first the belt motor M2 is activated for carrying the original document to the stopping position on the platen glass 2. Subsequently the belt motor M2 reaches the maximum speed, and, then, the trailing end of the original document is detected by the registration sensor S2 at a timing T1. For the first original document, the speed control for deceleration is started simultaneously with the arrival of the original document at a position (RG-start) of a timing T2 for starting the speed control of the belt motor M2.

Thereafter the belt motor M2 is driven at a low speed (100 mm/sec) from a timing T3, (RG-1st-on) when said belt motor M2 reaches said low speed, until the original document reaches the stopping position. In the present embodiment, the timing T2 of start deceleration, timing T3 of end of deceleration and timing T4 of stopping for the first original document are memorized in the form of distances from the original stopping position, and the timing T2 (RG-start) of start of deceleration for the 2nd and subsequent original documents is so adjusted that the timing T3 of end of deceleration falls on a point TARGET as shown by a broken line in FIG. 10A. It is also possible to provide an original detecting sensor at a predetermined position in front of the original stopping position, and to regulate the timing of start of deceleration according to the time from the start of deceleration to the detection of the original document by said sensor. Consequently the timing (RG-start)' of start of speed control for the 2nd and subsequent original documents is given as follows:

(RG-start)' = (RG-start) − (RG-1st-on) + Target

The low-speed transportation period for the 2nd and subsequent original documents is reduced as indicated by the broken line in FIG. 10A, so that the original feeding time is reduced as shown in a timing chart shown in FIG. 10B.

Figure 13:
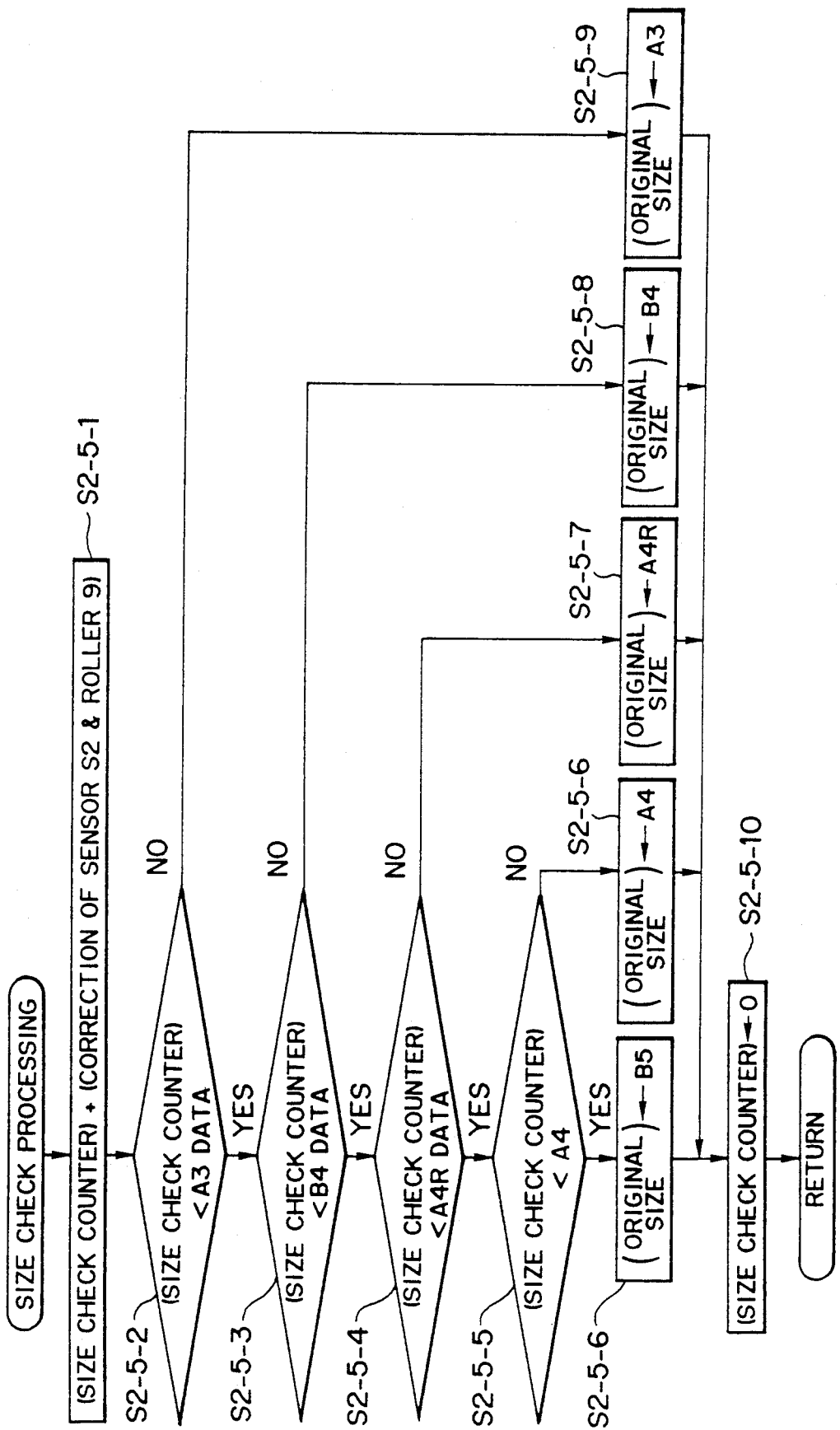
FIG. 13 is a flow chart showing a control sequence for size check control for the original documents.

Now reference is made to FIGS. 12 and 13 for explaining the details of such registration process (step 2-3). The registration process shown in FIG. 11 is executed at the interruption process for each clock signal for the belt motor M2 for transporting the original document to the predetermined position on the platen glass 2.

Figure 11B:
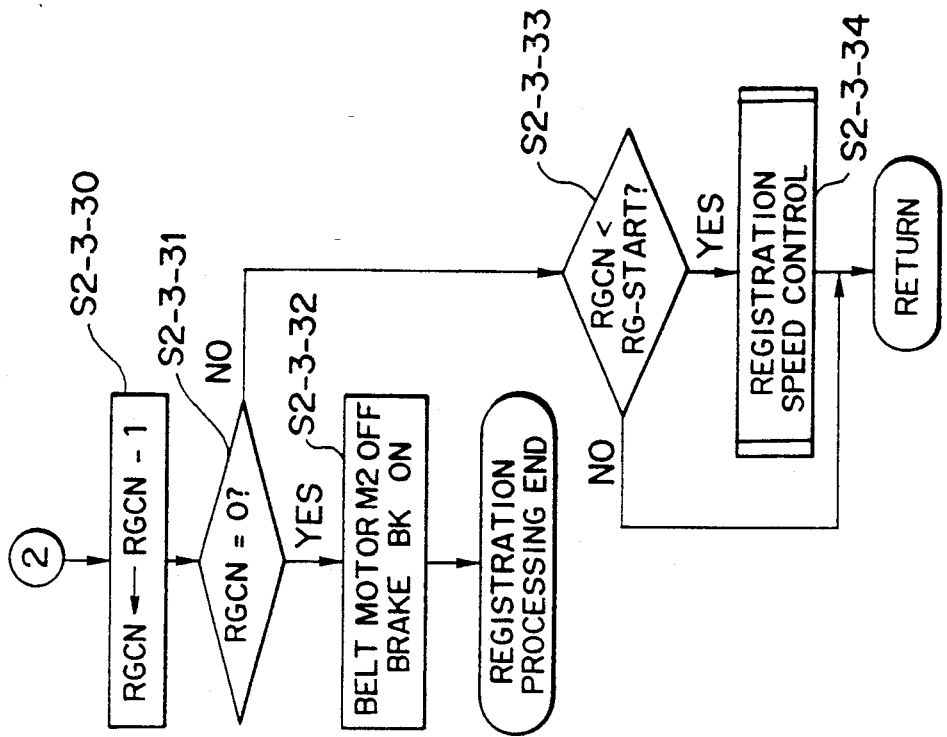
Figure 11A:
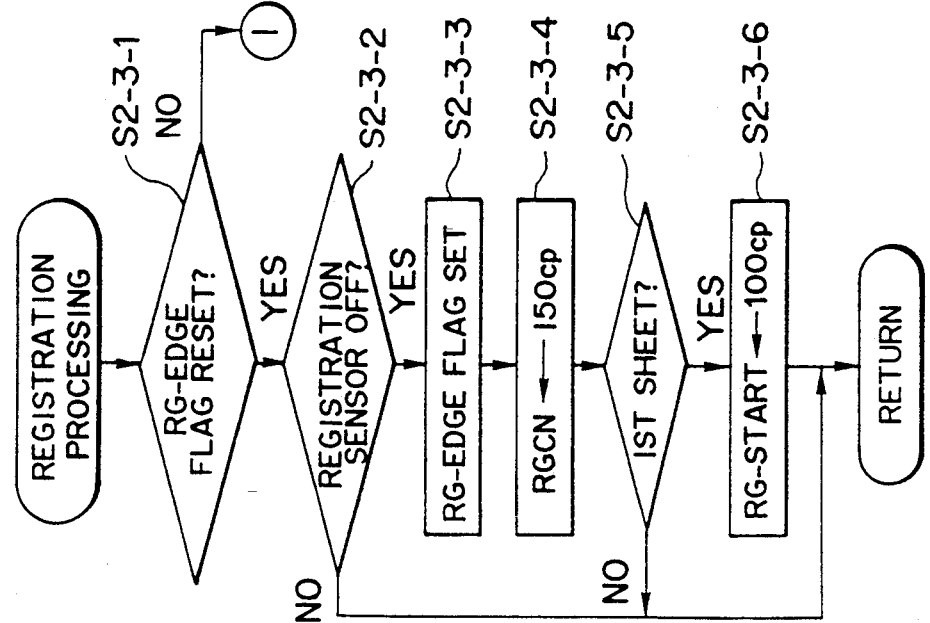
Figure 11C:
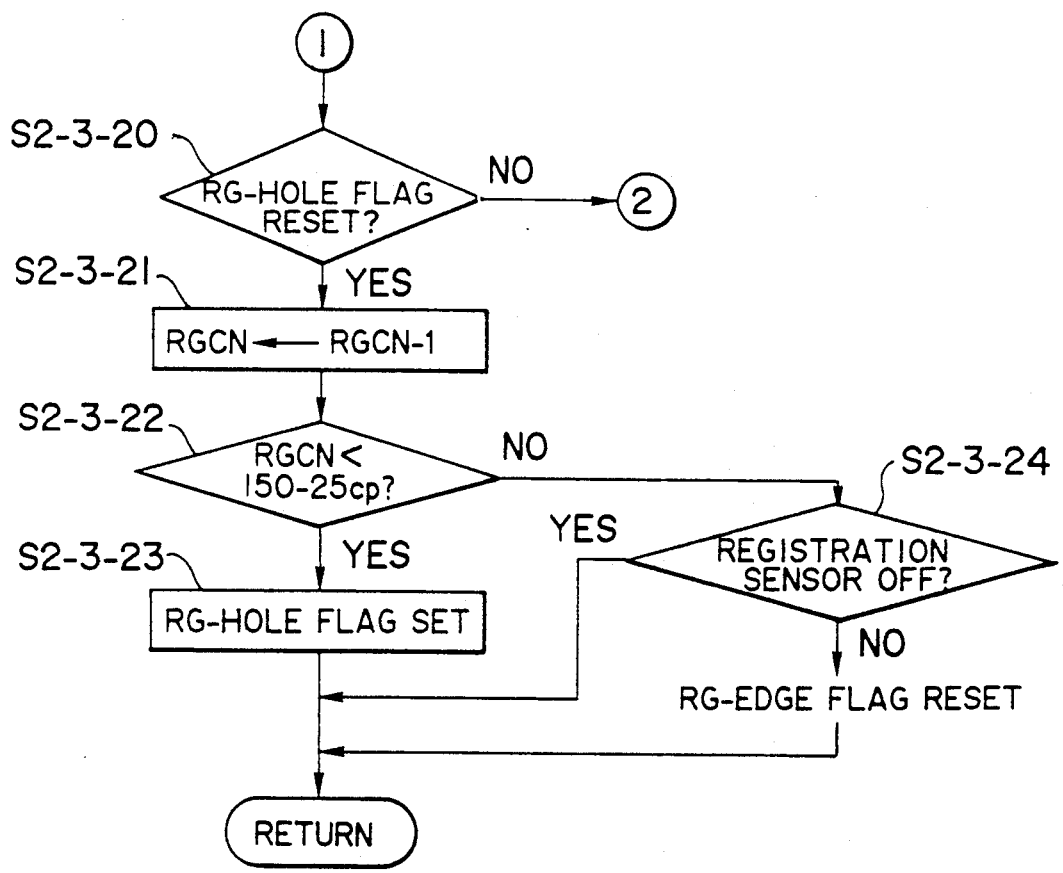

Referring to FIG. 11, as long as a RG-EDGE flag, which is set upon detection of the trailing end of the original document, is reset, there is discriminated whether the registration sensor S2 detects the trailing end of the original document (steps 2-3-1, 2-3-2). If the registration sensor S2 does not detect the trailing end of the original document, the registration routine is terminated until the next interruption process.

Upon detection of the trailing end of the original document by the registration sensor S2, the RG-EDGE flag is set, and a number of clock pulses corresponding to the distance from the registration sensor S2 to the original stopping position, which is 150 pulses in the present embodiment, is set in a registration counter RGCN (steps 2-3-2 - 2-3-4). In the case of the first original document, a number, 100 pulses, is set in a register RG-Start for determining the timing of start of speed control for the belt motor in the registration process.

In the present embodiment, 100 pulses are enough to reduce the speed of the belt motor to the predetermined speed (100 mm/sec) before the original stopping position. For the 2nd and subsequent original documents, the content of said register RG-Start is not renewed because it is determined in the registration process for the preceding original document (step 2-3-5).

If the step 2-3-1 identifies that the RG-EDGE flag has been set, the sequence proceeds to a step 2-3-20 for checking a punched original document. If a flag RG-HOLE to be set at the completion of the check for the holed original document is reset, the content of the register RGCN is reduced by one, and there is discriminated whether the content of said register RGCN indicates the advancement by 25 clock pulses corresponding to the distance of holes. If the original document has not been advanced, and if the registration sensor S2 is off, the registration process is terminated (steps 2-3-21/22/24).

If the registration sensor S2 is turned on by detecting the original document in this state, it is identified as a holed original, and the flag RG-EDGE is reset and the registration process is started anew from the step 2-3-1. After the advancement corresponding to the holes, the RG-HOLE flag is set and the sequence awaits the next interruption (steps 2-3-2/4/25).

On the other hand, if the RG-HOLE is set, indicating that the check for a holed original has been completed, the sequence proceeds to a step 2-3-30 to reduce the content of the register RGCN by one, and there is discriminated whether said content is equal to "0" indicating the completion of the registration process. If said process is not completed, the registration speed control, to be explained later, is executed when the content of the register RGCN becomes smaller than RG-Start, and the next interruption is awaited. If the content of the register RGCN is "0", the original document is identified as having reached the stopping position. Thus the belt motor M2 is deactivated, and the magnetic brake is applied. In this manner the registration process is terminated.

Now reference is made to FIG. 12 for explaining a registration speed control routine, shown in the step 2-3-34 in FIG. 11, for controlling the speed of the belt motor M2 and determining the start timing of speed control for the next original document. The control means corresponds to the control means 200 shown in FIG. 1, and the belt motor M2 constitutes a part of the transport means 300.

Referring to FIG. 12, if a flag RG-1st, indicating whether the present sequence has been executed for the first time, is reset, said flag RG-1st is set, then the belt motor M2 is deactivated, and the present control routine is terminated (steps 2-3-34-1/2/3).

Then, when this routine is executed, the sequence proceeds from the step 2-3-34-1 to 2-3-34-4 for discriminating whether the motor M2 has reached a predetermined speed (100 mm/sec) or lower. The speed of the belt motor M2 can be calculated from the interval between the interruptions by the belt clock pulses. If a flag RG-1st-ON, which is set when the speed of the belt motor M2 reaches 100 mm/sec or lower for the first time, is reset, said flag is set, and, for the first original document, the content of a register G-Start in the microcomputer 60, constituting the memory means 100, is renewed according to the learning algorithm explained before (steps 2-3-34-1/4/5/6/12).

For the second or subsequent original document, there is discriminated whether the value of the register RGCN at this point is too fast or too slow with respect to the Target constituting the speed target value. If the value of the register RGCN is slower by 5 clock pulses or more with respect to the target value, the content of the register RG-Start is increased by one, thereby expediting the start timing of the speed control (steps 2-3-34-6/7/8). Also if the value of the register RGCN is faster by 5 clock pulses or more with respect to the target value, the content of the register RG-Start is decreased by one, thereby delaying the start timing of the speed control (steps 2-3-34/6/7/11).

Besides, since the speed is slower than the target value in this case, the belt motor M2 is activated, and, if the step 2-3-34-4 identifies that the belt speed is faster than 100 mm/sec, the belt motor M2 is turned off and the present control routine is terminated (steps 2-3-34-4/12).

As explained in the foregoing, the original feeding control is conducted by controlling the speed of the transport means after the start of transportation of the original document, and reducing said speed prior to the arrival at the predetermined stopping position. For the first original document, the low speed is attained earlier, namely with sufficient timing, in consideration of the fluctuation in the driving system and in the characteristics of the original document, and the obtained result of control is stored in the memory. The start timing of said low speed control is corrected according to the result of control by the control means, and is fed back to the control of the second and subsequent original documents, thereby prolonging the period of high-speed transportation, so that the time required for original feeding can be reduced.

In the following there will be explained an embodiment in which the output of an analog photosensor provided on the sheet path is monitored and the timing of original transportation is controlled according to the result of said monitoring.

The structure of the original transporting system in the present embodiment is essentially the same as that shown in FIG. 2, except that a width limiting member provided on the original stacker 5 performs a jogging operation in the direction of width at each original document feeding.

Figure 14:
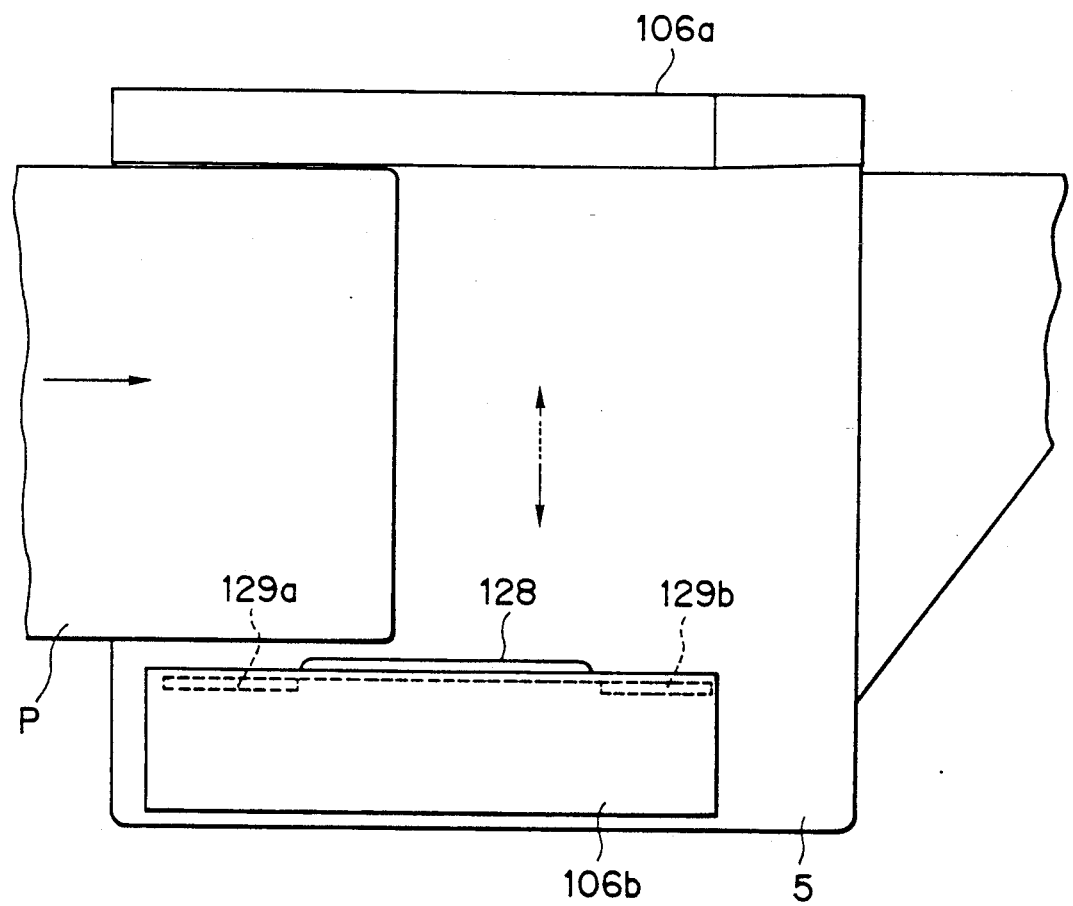
FIG. 14 is a schematic plan view of an original stacker.

FIG. 14 is a plan view of the original stacker 5 shown in FIG. 1, wherein width limiting members 106a, 106b define the width of the original document P, perpendicular to the transport direction thereof. The limiting member 106a at the back side constitutes a reference plane for the running of the original document P, and formed flat along the transporting direction thereof. The member 106b in the front side is divided into three portions, consisting of a central fixed wall 128 and movable walls 129a, 129b on both sides. The width limiting member 106b is rendered movable in a direction as indicated by a broken-lined arrow with respect to the original stacker 5, while maintaining the relative positions of the fixed wall 128 and the movable walls 129a, 129b, and can be fixed at an arbitrary position according to the width of the original document.

Figure 15A:
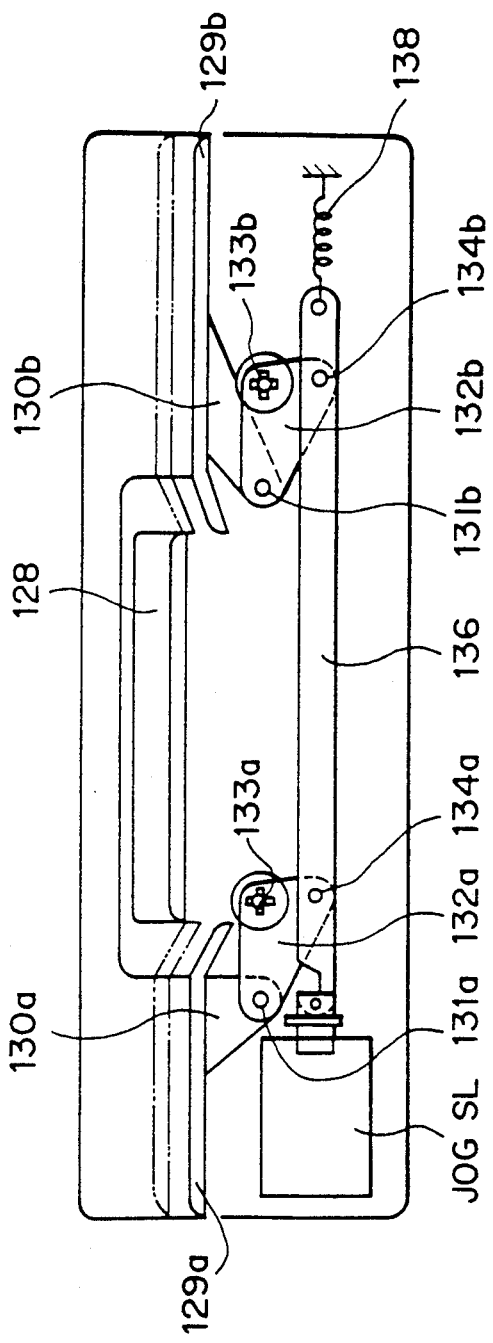
FIGS. 15A and 15B are respectively a plan view and an elevation view of a width limiting member.
Figure 15B:
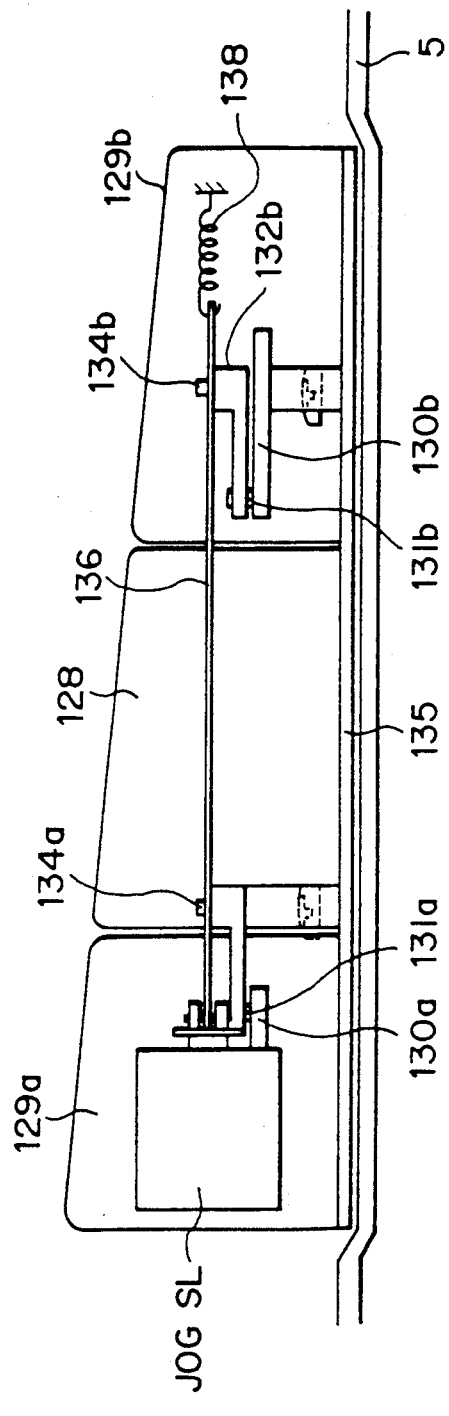

FIGS. 15A and 15B are respectively a plan view and an elevation view, showing the details of the width limiting member 106b at the front side, constituting a jogging member. The movable walls 129a, 129b are somewhat retracted toward the front side of the fixed wall 128, and are mutually connected in a position close to the original stacker tray 5. The movable walls 129a, 129b are respectively provided with projections 130a, 130b extended toward the front side, which are articulated with lever members 132a, 132b by means of pins 131a, 131b. Said lever members 132a, 132b are rotatably supported on a base member 135 by means of shafts 133a, 133b, and are provided with pins 134a, 134b engaging with holes of an arm member 136 having a solenoide JOGSL at an end and a return spring at the other end.

In the above-explained structure, when the solenoid JOGSL is not energized, the movable walls 129a, 129b are retracted from the fixed wall 128. The energization of said solenoid moves the arm member 136 toward the left, whereby the pins 134a, 134b of the lever members 132a, 132b are moved to left. Consequently said lever members 132a, 132b rotate clockwise about the shafts 133a, 133b to push the pins 131a, 131b of the projections of the movable walls 129a, 129b toward the back side. In response the movable walls 129a, 129b move to the back side beyond the fixed wall 128, as indicated by broken lines in FIG. 15A.

The original transporting operation in the automatic document feeder of the present embodiment is the same as that in the preceding embodiment shown in FIGS. 3 and 4, and will not, therefore, be explained further.

Figure 16:
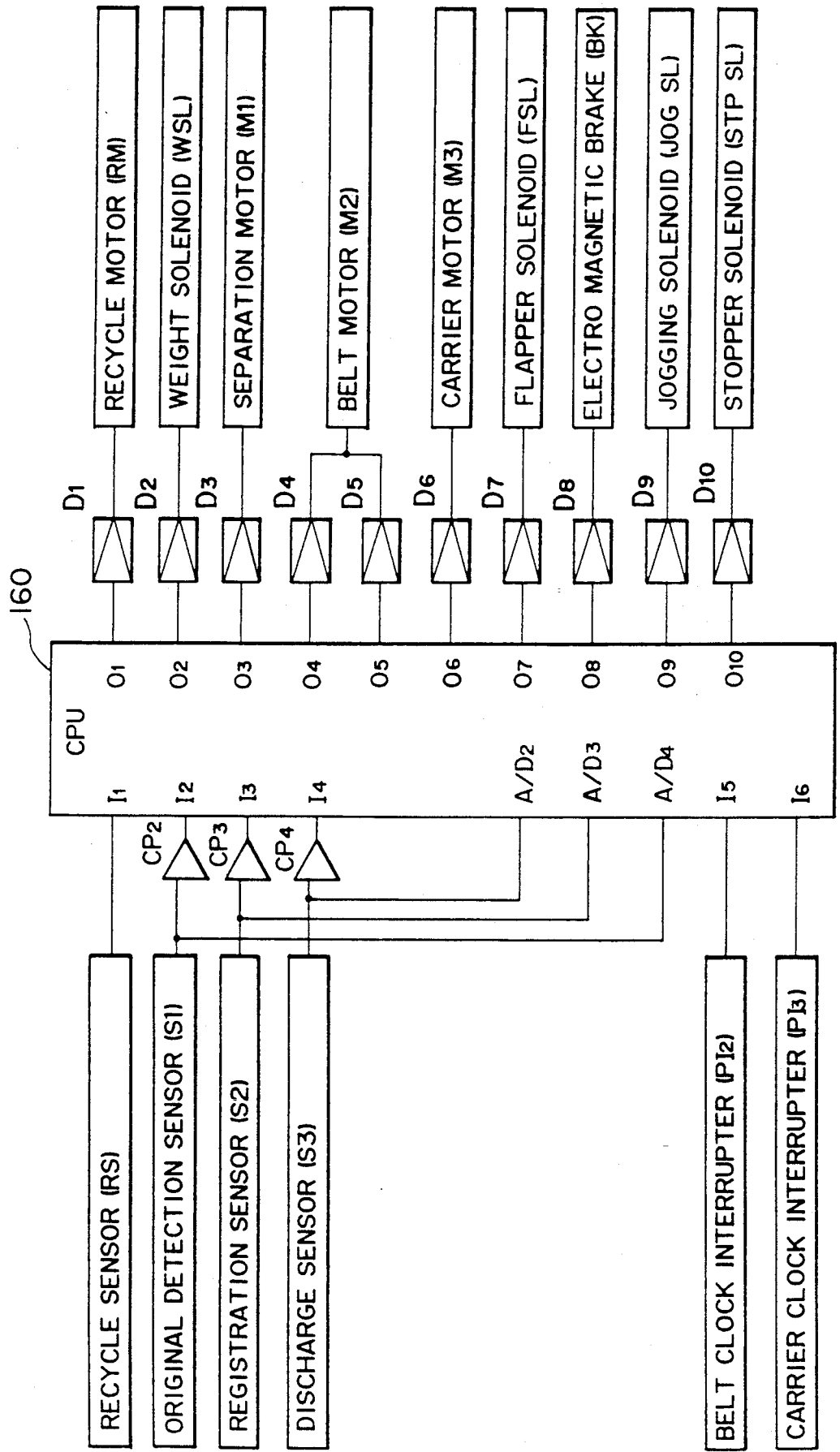
FIG. 16 is a block diagram of a control unit in a second embodiment.

An example of the control circuit in the present embodiment is shown in FIG. 16, wherein the same components as those in FIG. 5 are represented by the same symbols.

The control circuit is mainly composed of a known one-chip microcomputer (CPU) 160 incorporating a ROM, a RAM etc., and provided with input ports I1 - I4 for receiving input signals from various sensors, and output ports O1 - O10 connected to various loads through drivers D1 - D10. The microcomputer 160 is provided with a known A/D converter, of which channels A/D2-A/D4 receive outputs of various analog sensors.

An input port I1 is connected to a recycle sensor RS for detecting the state of a flag activated by the recycle lever 6; I2 to an original sensor (S1) for detecting the absence or presence of the original document on the stacker tray 5; I3 to a registration sensor (S2) for determining the process of original transportation in sheet path 13; and I4 to a sheet invert discharge sensor S3 for determining the timing of sheet discharge onto the stacker tray 5, and said original sensor S1, registration sensor S2 and discharge sensor S3 are respectively connected through comparators CP2 - CP4. The A/D channels A/D2 - A/D4 are directly connected to the original sensor S1, registration sensor S2 and discharge sensor S3.

An output port O1 is connected to a recycle motor RM for driving the recycle lever 6; O2 to a weight solenoid WSL for driving a weight 12; O3 to a separation motor M1 for driving the separating unit; O4 and O5 through a forward/reverse circuit to a belt motor M2 for driving the conveyor belt 3 and registration rollers 21a, 21b; O6 to a carrier motor M3 for driving the inverting roller 15; O7 to the flapper solenoide FSL for driving the flapper 20 for selecting the inverting or discharge sheet path; O8 to an electromagnetic brake BK for securely stopping the conveyor belt 3 and the registration rollers 21a, 21b; O9 to the jogging solenoid JOGSL for driving the jogging members (movable walls 129a, 129b) explained in FIG. 16; and O10 to a stopper solenoid STPSL for driving the aforementioned stopper member.

In the following there will be explained the operation of one-side mode in the above-explained structure. The main flow chart of the present embodiment is same as that shown in FIG. 6 and will not, therefore, be explained further. In the following, explanation will be given on subroutines.

At first a separation process will be explained with reference to FIG. 17. At first, if the original document is the first one (step 1-1), the recycle motor RM is turned on for driving the recycle lever 6 for detecting the partition of the original stack S, and the separation motor M1 is also turned on to separate the documents of the stack S (step 1-3). At the same time, the jogging process is started to align the original stack S in the direction of width (step 1-5).

Figure 20:
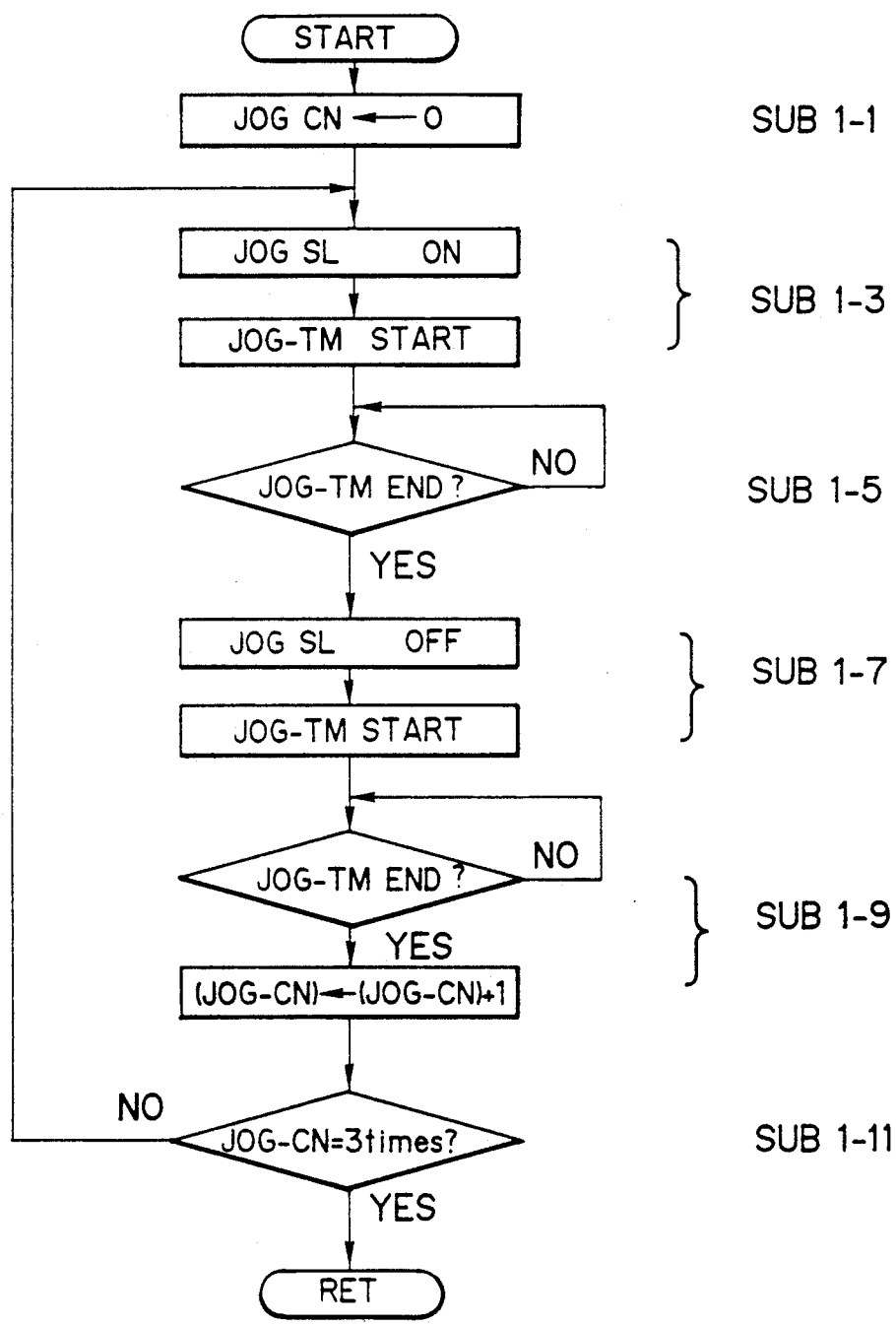
FIG. 20 is a flow chart of a jogging process in said embodiment.

Said jogging process will be explained according to a flow chart shown in FIG. 20. At first a counter JOG-CN for determining the number of joggings is initialized, then the solenoid JOGSL for pushing the movable walls 129a, 129b of the width limiting member is energized, and an arbitrarily settable timer JOG-TM is simultaneously started (SUB1-3). Upon expiration of said timer JOG-TM (SUB1-5), the solenoid JOGSL is deactivated to return the movable walls 129a, 129b to the original position, and the timer JOG-TM is started as explained above (SUB1-7). Upon expiration of the time, the number of jogs is increased (SUB1-9), and the sequence returns to the step SUB1-3 until three reciprocating cycles of the movable walls 129a, 129b are completed (SUB1-11). In this manner the stacked original documents are aligned in the direction of width, thereby prevented from skewed advancement or registration error in the lateral direction.

Figure 17:
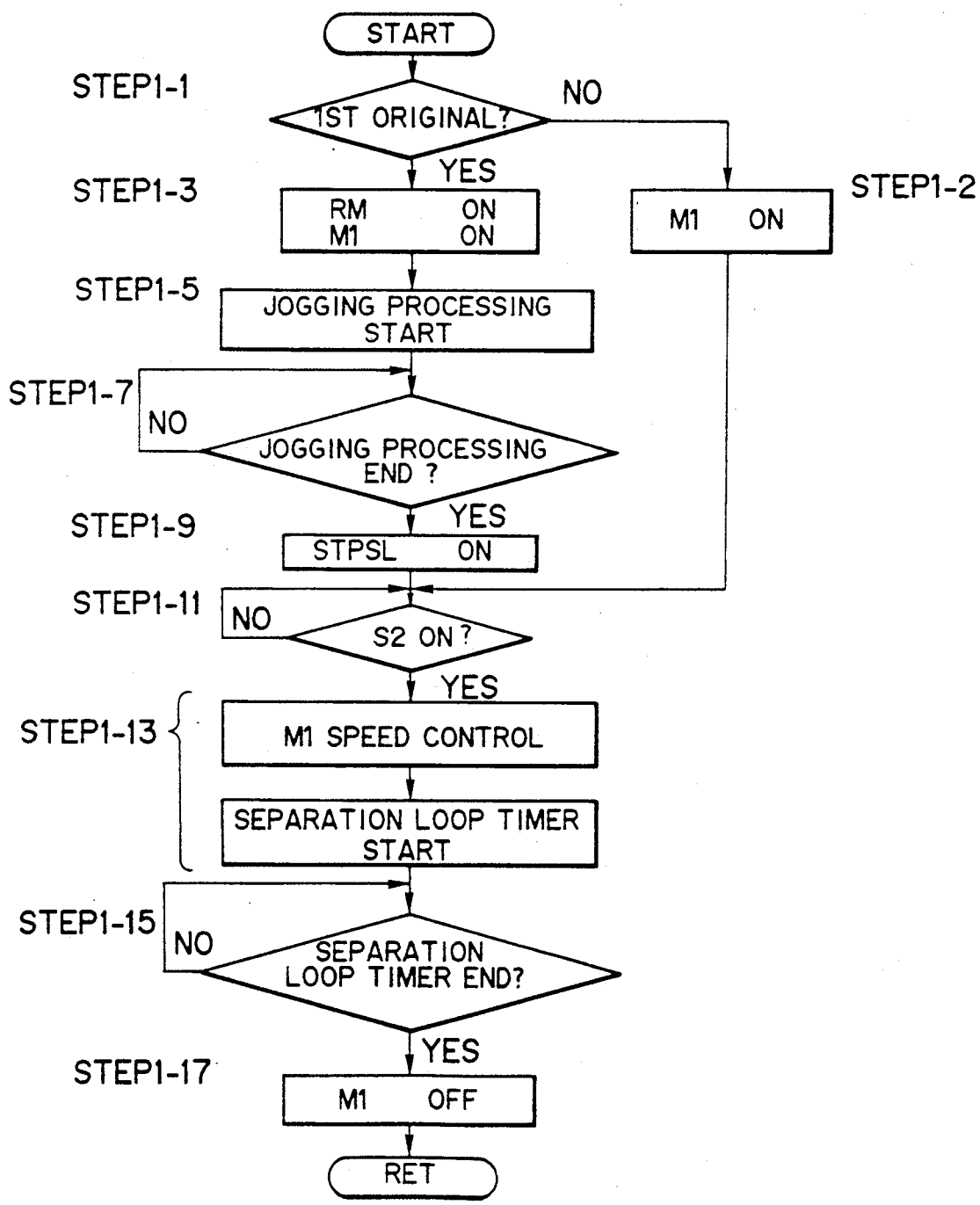
FIG. 17 is a flow chart of a separating process in said embodiment.

Upon completion of the jogging process (step 1-7), the sequence returns to the flow chart shown in FIG. 17, and the stopper solenoid STPSL is energized to lower the stopper 11 for separating the lowermost original only from the stack S (step 1-9). When the front end of the original document is detected by the registration sensor S2 in the sheet path I (step 1-11), speed control is started to shift the separation motor M1 to a low speed, and a separation loop timer is started (step 1-13). Upon expiration of said timer (step 1-15), the separation motor M1 is turned off (step 1-17). Thus the original document reaches the nip portion between the registration rollers 21a, 21b at a low speed, whereby the front end of the original document is protected from damage and the noise of collision is abated. Thus the original document stops with a predetermined amount of loop, which will have an effect of correcting any skewed position of the original in the separation. If the step 1-1 identifies a second or subsequent original document, the separation motor M1 is turned on (step 1-2) and the sequence proceeds to a step 1-11.

Figure 18:
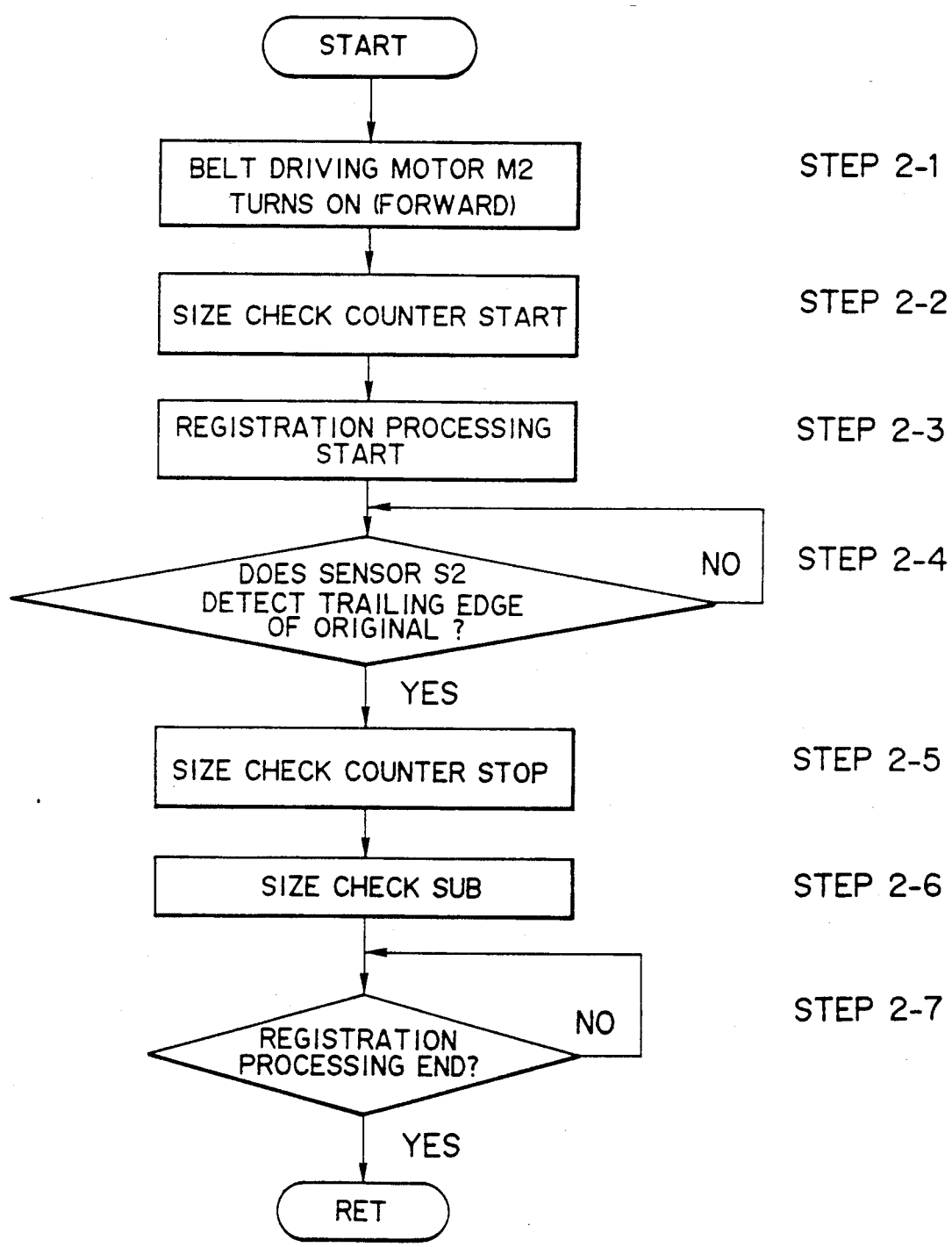
FIG. 18 is a flow chart of a document feeding process in said embodiment.

In the following there will be explained a sheet feeding process, in the step 2 in FIG. 6, with reference to FIG. 18. At first the registration rollers 21a, 21b and the conveyor belt 3 are activated, and the belt motor M2 is activated in the forward direction, in order to advance the original document from the sheet path I to II (step 2-1). Simultaneously size check counter, for counting the clock signals entered from the belt clock photointerruptor PI2, is started (step 2-2) thereby starting the measurement of the original size. Also the registration process, to be explained later, is started (step 2-3). In response to the passing of the rear end of the original document through the registration sensor S2 (step 2-4), said size check counter is deactivated (step 2-5), and the size of the original document is identified, according to thus obtained data, through the size check subroutine shown in FIG. 13 (step 2-6). When thus started registration is completed, the original feeding process is terminated (step 2-7).

Now reference is made to FIG. 19 for explaining the sheet discharge process of the step 7 shown in FIG. 6. At first the belt motor M2 is started in the reverse direction for discharging the original document on the platen 2 (step 7-1), and, upon detection of the leading end of the original document by the discharge sensor S3 (step 7-2), the carrier motor M3 is turned on (step 7-3), whereby the original document is transported from the sheet path III to IV. Upon detection of the trailing end thereof by the discharge sensor S3 (step 7-4), there is executed a sensor level check (2), to be explained later, for determining the value of a carrier counter FC1 for controlling the start timing of the speed control of the carrier motor M3 for sheet alignment and that of a counter FC2 for controlling the speed thereafter and determining the distance for discharge of the original document onto the original stacker tray 5 (step 7-4'). The count-up operation of said two counters FC1, FC2 is controlled by the interruption procedure of the input from the carrier clock photointerruptor PI3 to the microcomputer 60, in such a manner that the count securely corresponds to the actual moving distance of the original document. In the present embodiment, the counter FC1 is set to a distance of 200 mm shorter by 50 mm than the distance from the sensor S3 to the roller 17, and the counter FC2 is set to a distance of 70 mm.

The counter FC1 is started in a step 7-5, and, after the completion of operation thereof, the counter FC2 is started (step 7-7). The counter FC2 is used for determining the length of speed control for discharging the original documents in aligned state onto the original stacker tray 5. The speed control is continued (step 7-8) until the completion of the operation of the counter FC2 (step 7-9), then the carrier motor M3 is turned off (step 7-10). Then, for forming an interval until the original document falls on the tray 5, an original down timer ORG-DWN-TM is activated (step 7-11), and, upon expiration thereof (step 7-12), the jogging solenoid JOGSL is energized to drive the movable walls 129a, 129b for aligning the discharged original documents, and a timer EJCT-JOG-TM for determining the driving period is activated (step 7-15). Upon expiration thereof (step 7-17), the jogging solenoid JOGSL is turned off (step 7-19), and the discharge process is terminated.

Figure 21:
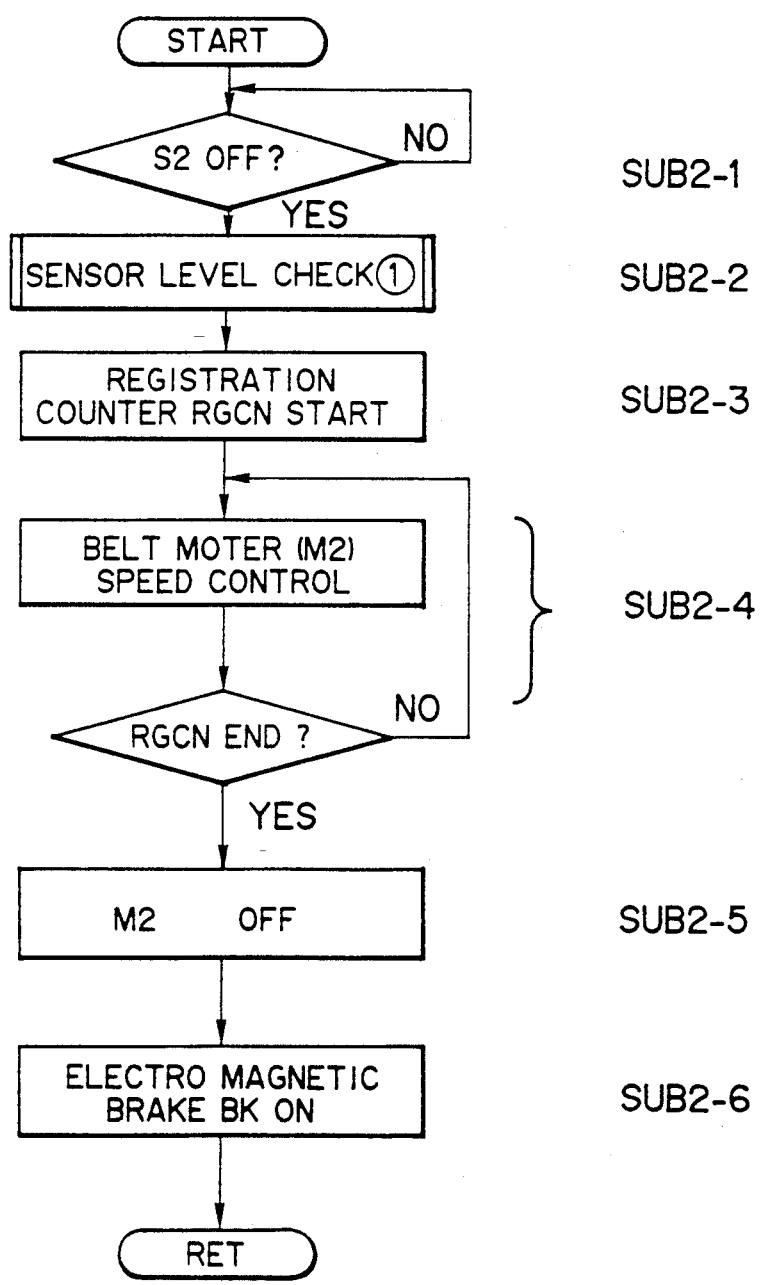
FIG. 21 is a flow chart of a registration process in said embodiment.

Now reference is made to FIG. 21 for explaining the registration process. At first, upon detection of the trailing end of the original document by the registration sensor S2 (SUB2-1), there is executed a sensor level check process (1), to be explained later, for setting a registration counter RGCN for stopping the original document at the predetermined position on the platen 2 (SUB2-2), and said registration counter RGCN is started (SUB2-3). Said registration counter RGCN counts the pulses from the belt clock photointerruptor, and the count thereof securely corresponds to the moving amount of the original document. Then the low speed control of the belt motor M2 is started for precisely stopping the original document at the stopping position on the platen 2, and said control is continued until the registration counter RGCN completes its function (SUB2-4). At said completion the belt motor M2 is turned off (SUB2-5), and the electromagnetic brake BK is applied to stop the original document at said predetermined position (SUB2-6).

Now reference is made to FIG. 13 for explaining the size check subroutine, in which the actual original size is obtained from the size check count data mentioned above, with a correction for the distance from the nip position between the registration rollers 21a, 21b to the registration sensor S2. In this state the original document is carried by the registration rollers 21a, 21b and the conveyor belt 3, and the amount of said carrying securely corresponds to the count of the belt clock photointerruptor. The size, such as B5, A4, A4R, B4 or A3 is identified from thus corrected size data.

Figure 22:
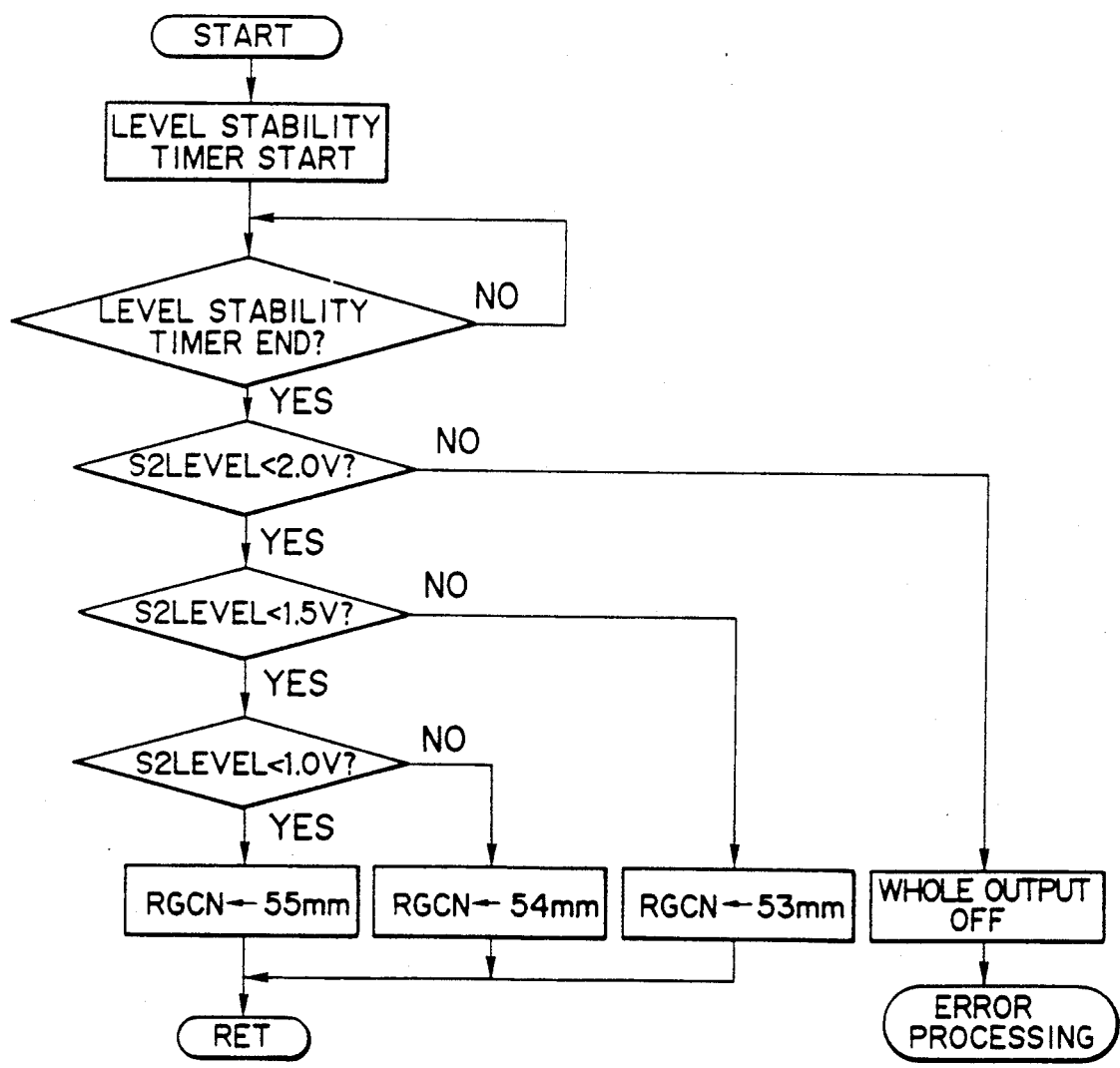
FIG. 22 is a flow chart of a sensor level check process (1) in said embodiment.
Figure 23:
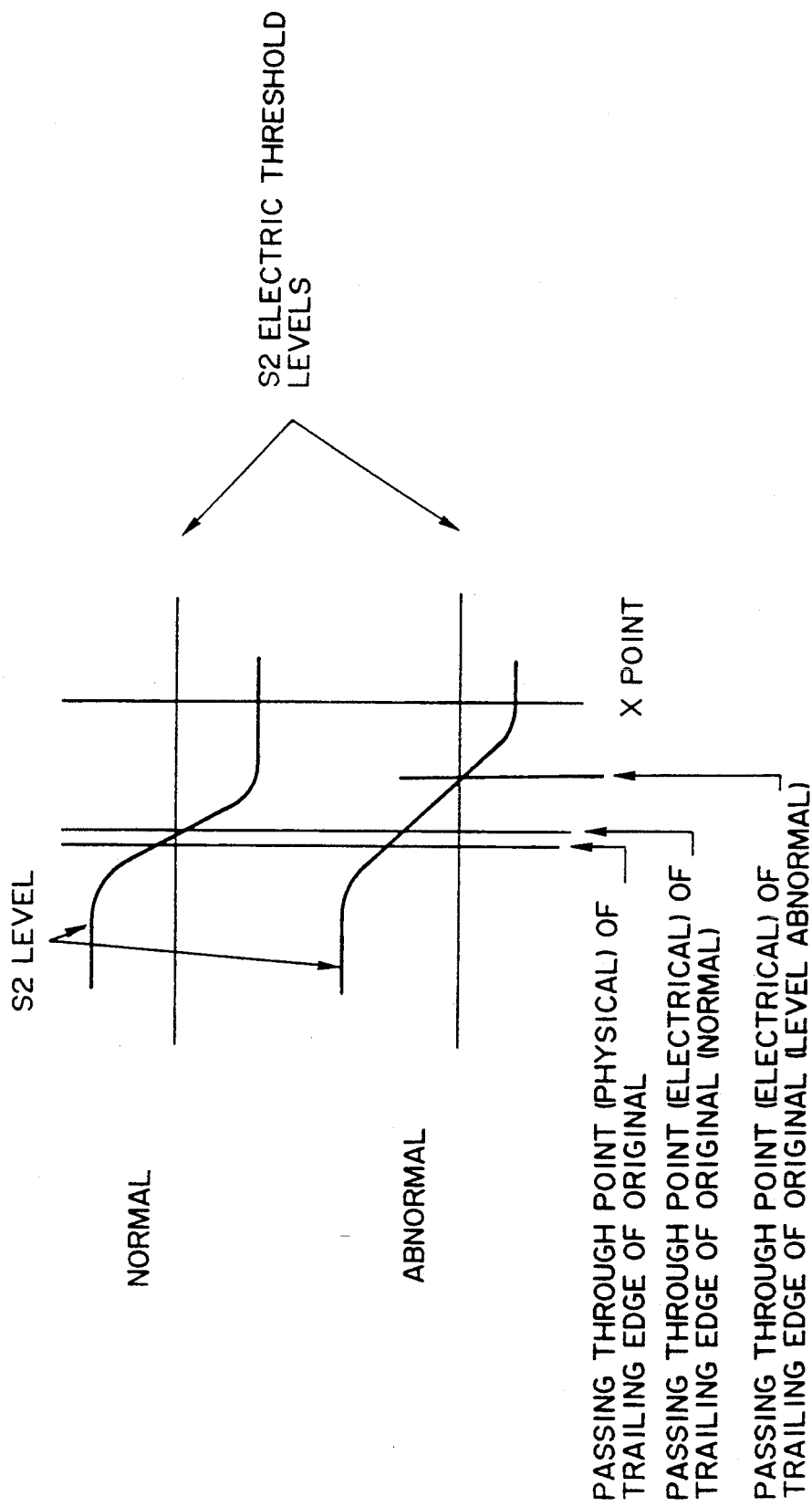
FIG. 23 is a wave form chart showing the level of a registration sensor in said embodiment.

In the sensor level check process (1) explained above, as shown in FIG. 23, in order to compensate the difference between the physical passing of the trailing end of the original document through the optical axis of the registration sensor S2 and the electrical detection of said passing, there is conducted a process of awaiting the stabilization of the sensor level as shown in the flow chart in FIG. 22 for identifying the characteristic of the registration sensor S2 from the off-level thereof at a point X shown in FIG. 23, and correcting the value of the registration counter RGCN according to said level of the registration sensor at said point X, thereby preventing eventual fluctuation in the stopping position caused by circumferential conditions. Particularly an output of the registration sensor exceeding 2.0 V may cause a problem in the original transporting ability, so that all the outputs are turned off and an unrepresented error process is executed.

Figure 24:
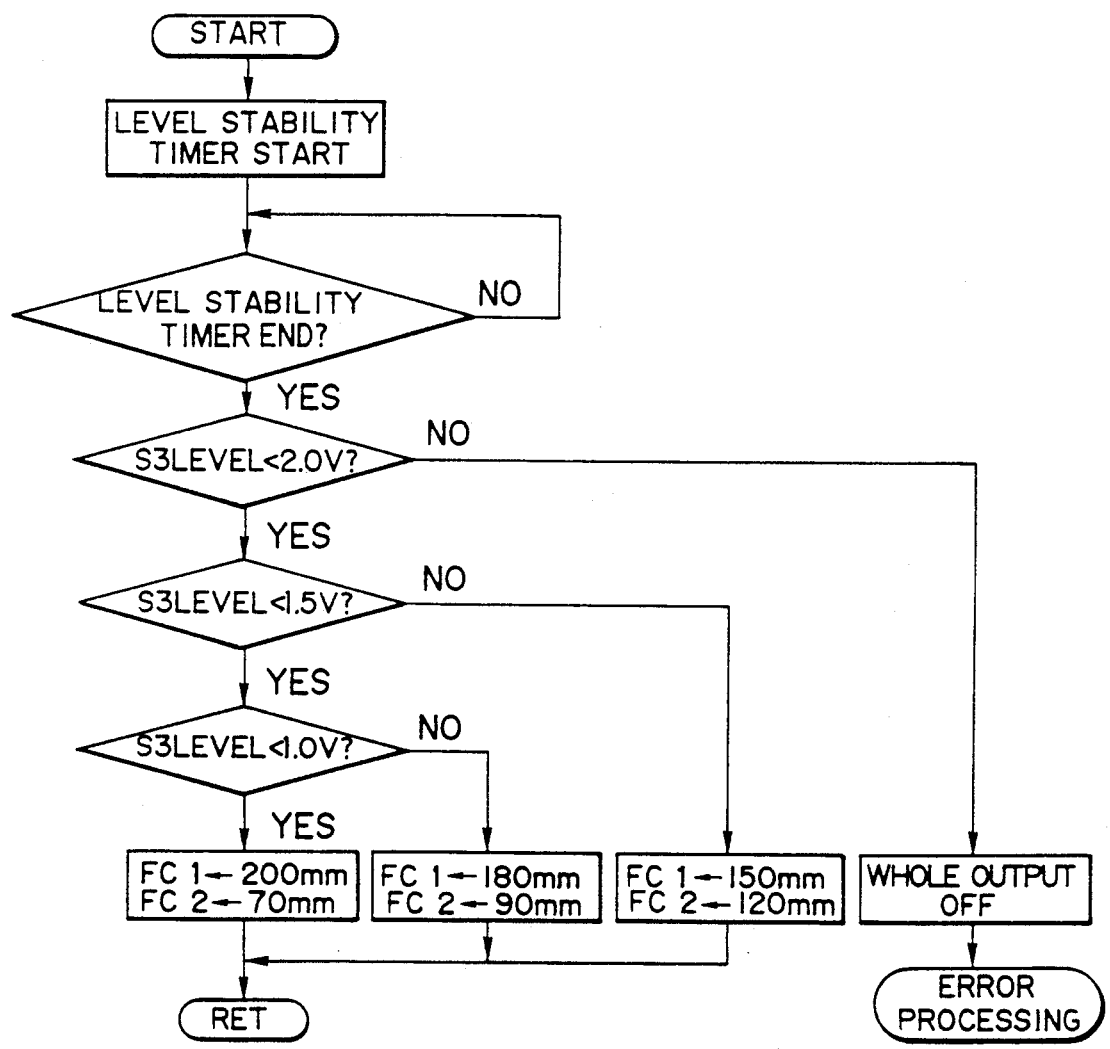
FIG. 24 is a flow chart of a sensor level check process (2) in said embodiment.

In the sensor level check process (2), as shown in FIG. 24, the values of the counters FC1, FC2 are determined according to the level of the discharge sensor S3 in the absence of the original document, as shown in FIG. 24, in a similar manner as in the above-explained sensor level check process (1), thereby preventing the shooting of the discharged original onto the stacker tray 5. Also in this case, a sensor level in excess of 2.0 V may cause a problem in the original transporting ability, so that all the outputs are turned off and an error process is carried out.

In the above-explained embodiment, the output of the analog photosensor for determining the timing of transport control is constantly monitored by the A/D converter in the microcomputer 160, and said timing is corrected in consideration of the changes in the circumferential conditions and other time-dependent changes estimated from the change in the sensor level in the absence of the original document, whereby it is rendered possible to improve the accuracy of the transport control for the original documents and to prevent sheet jamming.

Though the discussion of the foregoing embodiment has been limited to the case of original documents in sheet form, the concept is likewise applicable for example to the transportation of recording sheets.

We claim:

1. A sheet handling apparatus comprising:
transport means for transporting an original to a predetermined position;
control means for controlling said transport means so as to perform a deceleration control before the original arrives at said predetermined position after the original is transported at a predetermined speed;
monitor means for monitoring an operational state of said transport means at the time of execution of said deceleration control; and
memory means for storing information representing the operational state of said transport means monitored by said monitor means;
wherein said control means starts the deceleration control for a first original in a predetermined timing, and corrects a start timing of the deceleration control for a second original in accordance with the information representing the operational state of said transport means monitored by said monitor means and stored in said memory means in course of the deceleration control for the first original.

2. An apparatus according to claim 1, wherein said control means controls said transport means so as to perform the deceleration control after the original is transported at a predetermined speed and so as to cause the original to be transported at a speed lower than said predetermined speed.

3. An apparatus according to claim 1, wherein said control means corrects a start timing of the deceleration control for the second original in accordance with the information stored in said memory means in such a manner that a transport time for the second original at said predetermined speed is extended.

4. An apparatus according to claim 2, wherein said control means corrects a start timing of the deceleration control for the second original in accordance with the information stored in said memory means in such a manner that a transport time for the second original at said predetermined speed is extended.

5. An apparatus according to claim 2, 3 or 4, wherein said control means controls said transport means so as to cause the original to be stopped at said predetermined position after the original is transported at said lower speed.

6. An apparatus according to any of claims 1, 2 or 3, wherein said monitor means has signal generating means for generating clock signals in accordance with an operation of said transport means, and monitors the operational state of said transport means based on said clock signals.

7. An apparatus according to claim 5 wherein said monitor means has signal generating means for generating clock signals in accordance with an operation of said transport means, and monitors the operational state of said transport means based on said clock signals.

8. An apparatus according to claim 6, wherein said monitor means monitors an original transport speed of said transport means based on a generation interval of said clock signals.

9. An apparatus according to any of claims 1 and 2-4, wherein said transport means transports the original to an exposure position.

10. An apparatus according to claim 6, wherein said transport means transports the original to an exposure position.

11. An apparatus according to claim 7, wherein said transport means transports the original to an exposure position.

12. A sheet transporting apparatus comprising:
transport means for transporting a sheet along a transport path;
detection means for detecting the presence or absence of the sheet on said transport means;
control means for controlling said transport means in a predetermined control timing in accordance with a detection output of said detection means; and
correction means for monitoring the detection output of said detection means at the time of sheet non-detection and for correcting said control timing in accordance with a monitor result.

13. An apparatus according to claim 12, wherein said control means is adapted to control said transport means so as to stop the sheet after a first time from the detection of an end of the sheet by said detection means; and said correction means is adapted to correct said first time in accordance with the output value of said detection means.

14. An apparatus according to claim 12, wherein said control means is adapted to switch the transport speed of the sheet after a second time from the detection of an end of the sheet by said detection means; and said correction means is adapted to correct said second time in accordance with the output value of said detection means.

15. An apparatus according to claim 12, further comprising means for interrupting the sheet transportation by said transport means in case the output value of said detection means exceeds a predetermined value.

16. An apparatus according to any of claims 12 to 14, wherein said detection means comprises an optical sensor.

* * * * *

UNITED STATES PATENT AND TRADEMARK OFFICE
CERTIFICATE OF CORRECTION

PATENT NO. : 5,018,716
DATED : May 28, 1991
INVENTOR(S) : Akimaro Yoshida, et al.

It is certified that error appears in the above-identified patent and that said Letters Patent is hereby corrected as shown below:

ON THE COVER PAGE

At [30], under "Foreign Application Priority Data," "Mar.11, 1988 [JP] Japan..............63-057756" should read --Mar.11, 1988 [JP] Japan..............63-057755--.

Column 1, line 49, "thereof" should read --thereof,--.

Column 5, line 12, "08" should read --O8--.
Column 5, line 20, "output port 06" should read --output port O6--.
Column 5, line 21, "output port 07" should read --output port O7--.
Column 5, line 47, "stated." should read --started.--.

Column 11, line 6, "flapper solenoide FSL" should read --flapper solenoid FSL--.

Column 12, line 7, "size" should read --a size--.

Signed and Sealed this

Twentieth Day of October, 1992

*Attest:*

DOUGLAS B. COMER

*Attesting Officer*   *Acting Commissioner of Patents and Trademarks*